United States Patent
Kerofsky et al.

(10) Patent No.: US 12,299,903 B2
(45) Date of Patent: May 13, 2025

(54) GLOBAL MOTION MODELING FOR AUTOMOTIVE IMAGE DATA

(71) Applicant: QUALCOMM Incorporated, San Diego, CA (US)

(72) Inventors: Louis Joseph Kerofsky, San Diego, CA (US); Geert Van Der Auwera, San Diego, CA (US); Marta Karczewicz, San Diego, CA (US); Kuan-Ting Shen, National City, CA (US); Dangdang Shao, Fremont, CA (US); Khalid Tahboub, San Diego, CA (US); Bing Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/929,242

(22) Filed: Sep. 1, 2022

(65) Prior Publication Data
US 2024/0078684 A1    Mar. 7, 2024

(51) Int. Cl.
*H04N 23/62* (2023.01)
*G06T 5/80* (2024.01)
(Continued)

(52) U.S. Cl.
CPC ............... *G06T 7/248* (2017.01); *G06T 5/80* (2024.01); *G06T 7/20* (2013.01); *G06T 7/238* (2017.01);
(Continued)

(58) Field of Classification Search
CPC .. G06T 7/248; G06T 5/80; G06T 7/74; G06T 2207/20068; G06T 2207/30244;
(Continued)

(56) References Cited

U.S. PATENT DOCUMENTS 10,627,512 B1 *  4/2020  Hicks .................... G06T 5/50
2002/0191838 A1 * 12/2002  Setterholm ............ G06T 7/593
                                                          382/154
(Continued)

FOREIGN PATENT DOCUMENTS

CN          109074653 A  * 12/2018  ............ B60W 40/02

OTHER PUBLICATIONS

Eddeland, Recognition of suddenly appearing obstacles using optical flow for autonomous vehicles [thesis], Accessioned: Jul. 3, 2019 [retrieved: Nov. 2, 2024], Chalmers University of Technology,46 pages. Retrieved: https://odr.chalmers.se/items/cb243d38-1d0a-4ed8-ba50-6cfbeb1f69ea (Year: 2019).*

(Continued)

*Primary Examiner* — Henok Shiferaw
*Assistant Examiner* — Dennis Rosario
(74) *Attorney, Agent, or Firm* — Patterson + Sheridan, L.L.P.\Qualcomm

(57) ABSTRACT

Certain aspects of the present disclosure provide techniques for global motion modeling. Embodiments include receiving a first image and a second image from a camera attached to a moving object. Embodiments include identifying a pixel in the first image. Embodiments include determining, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface. Embodiments include determining, using the vector, a location of the real-world point in the second image.

26 Claims, 16 Drawing Sheets

(51) Int. Cl.

| | |
|---|---|
| *G06T 7/20* | (2017.01) |
| *G06T 7/238* | (2017.01) |
| *G06T 7/246* | (2017.01) |
| *G06T 7/70* | (2017.01) |
| *G06T 7/73* | (2017.01) |
| *G06T 7/80* | (2017.01) |
| *B60R 1/20* | (2022.01) |
| *B60R 11/04* | (2006.01) |
| *G06T 7/231* | (2017.01) |
| *G06V 20/52* | (2022.01) |
| *G06V 20/58* | (2022.01) |

(52) U.S. Cl.
CPC .................. *G06T 7/70* (2017.01); *G06T 7/74* (2017.01); *G06T 7/80* (2017.01); *H04N 23/62* (2023.01); *B60R 1/20* (2022.01); *B60R 11/04* (2013.01); *B60R 2300/00* (2013.01); *B60W 2420/403* (2013.01); *G06T 7/231* (2017.01); *G06T 2207/10016* (2013.01); *G06T 2207/10028* (2013.01); *G06T 2207/20068* (2013.01); *G06T 2207/30244* (2013.01); *G06T 2207/30252* (2013.01); *G06T 2219/2016* (2013.01); *G06V 20/52* (2022.01); *G06V 20/58* (2022.01)

(58) Field of Classification Search
CPC . G06T 2207/30252; G06T 2207/10016; G06T 7/20; G06T 7/80; G06T 2207/10028; G06T 7/231; G06T 7/238; G06T 7/70; G06T 2219/2016; G06T 7/215; G06T 2207/30248; G06V 20/58; G06V 20/588; G06V 20/56; B60R 1/22; B60R 1/23; B60R 1/24; B60R 1/25; B60R 1/26; B60R 1/27; B60R 2300/105; B60R 2300/303; B60R 2300/101; B60R 2300/102; B60R 2300/107; B60R 2300/802; B60R 11/04; B60R 2300/60; B60R 2300/607; B60R 1/20; B60R 1/28; B60W 2420/403; H04N 23/62; H04N 5/145; H04N 5/144

See application file for complete search history.

(56) References Cited

U.S. PATENT DOCUMENTS

| | | | | |
|---|---|---|---|---|
| 2009/0010495 | A1* | 1/2009 | Schamp | G06F 18/254 382/106 |
| 2011/0262002 | A1* | 10/2011 | Lee | G06F 3/017 382/103 |
| 2012/0134548 | A1* | 5/2012 | Rhoads | G06Q 20/3276 398/115 |
| 2013/0251194 | A1* | 9/2013 | Schamp | G06T 7/11 382/199 |
| 2015/0086080 | A1 | 3/2015 | Stein et al. | |
| 2019/0080181 | A1* | 3/2019 | Ermilios | G06V 20/588 |
| 2019/0080476 | A1* | 3/2019 | Ermilios | G06V 20/56 |
| 2022/0066456 | A1* | 3/2022 | Ebrahimi Afrouzi | G06F 3/04883 |

OTHER PUBLICATIONS

Search machine translation of CN-109074653-A to Emmilios P, Method For Detecting Objects Beside the Road of Motor Vehicle, A Computing Device, A Driver Assistance System and Motor Vehicle, translated Feb. 12, 2025, 12 pages. (Year: 2025).*

Anonymous: "What is Camera Calibration?", MATLAB & Simulink, MathWorks Deutschland, Oct. 26, 2016, pp. 1-5, XP093090320, The whole document.

International Search Report and Written Opinion—PCT/US2023/070562—ISA/EPO—Nov. 7, 2023.

Jung B., et al., "Real-time Motion Tracking from a Mobile Robot", International Journal of Social Robotics, vol. 2, No. 1, Mar. 2010, pp. 1-16, XP055401116, sections 3, 4.

Peter., "Optics basics: Camera Calibration", Agmanic Vision, Oct. 31, 2019, pp. 1-13, XP093090316, The whole document.

Sunkara A., et al., "Joint Representation of Translational and Rotational Components of Optic Flow in Parietal Cortex", Proceedings of the National Academy of Sciences, vol. 113, No. 18, Apr. 19, 2016, pp. 5077-5082, XP093090340, p. 5077, figure 1.

* cited by examiner

GLOBAL MOTION MODELING FOR AUTOMOTIVE IMAGE DATA

Aspects of the present disclosure relate to object detection and tracking based on image data captured from a non-stationary source such as an automobile.

Estimation of optical flow between two frames of video is a foundational component of video processing. Optical flow refers to the pattern of apparent motion of physical components (e.g., objects, surfaces, and edges) in a visual scene caused by the relative motion between an observer and a scene. Optical flow may be used for various applications such as frame rate conversion in display, video compression, assisting video scene understanding, and other types of applications. Motion of pixels is generally caused either by motion of objects in the scene or motion of the camera recording the scene. The latter is referred to as global motion while the former is referred to as local motion. Understanding the motion due to camera movement is a significant component of estimating optical flow. Global motion estimation can improve the robustness of the entire estimation process and reduce complexity when the model is accurately estimated.

Automotive use cases feature significant high-speed motion and often involve the use of wide-angle lenses to produce views surrounding a vehicle. Many conventional global motion models have limited effectiveness when dealing with the unique aspects of video captured from a camera on a moving vehicle. In addition to the limitations of the motion model, estimation of the parameters of the model may be unreliable, such as due to low light, weather conditions, shadows, limited texture, noise, and the like. As such, pure image-based motion analysis may be unreliable in the automotive context. Recent efforts to apply machine learning to the problem of global motion in the automotive context have shown promise, but significant complexity arises when a variety of camera orientations and lens distortions must be considered, each requiring a different model. Another challenge in automotive applications arises from the limited ground truth training data, as methods for recording high-accuracy high-resolution motion information from a real outdoor scene are limited.

Accordingly, there is a need for improved techniques for understanding image data captured from a moving source such as a vehicle.

BRIEF SUMMARY

Certain aspects provide a method, including: receiving a first image and a second image from a camera attached to a moving object; identifying a pixel in the first image; determining, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; and a second parameter related to motion of the moving object; and determining, using the vector, a location of the real-world point in the second image.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1B:
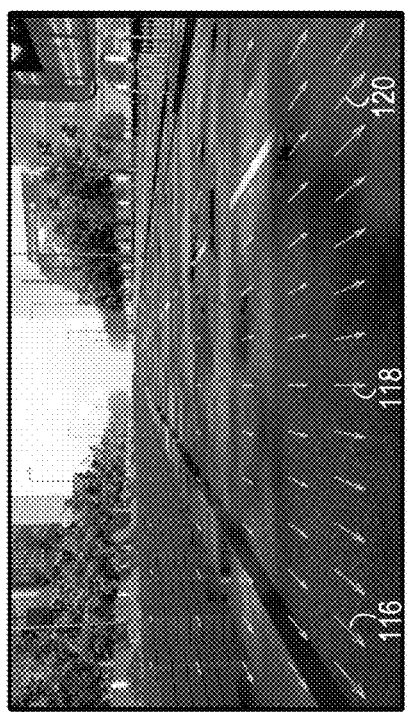
FIG. 1B-D depict example images captured by a camera related to global motion modeling.

Aspects of the present disclosure provide apparatuses, methods, processing systems, and non-transitory computer-readable mediums for global motion modeling.

There are a variety of challenges associated with efficiently producing optical flow in video sequences captured from moving objects, such as automotive applications, with different orientations and locations of cameras, and various types of wide-angle lens distortion. Efficiency concerns may lead to limiting computation with conventional methods and limiting network size for neural network-based approaches. One challenge is how to exploit the limitations of the automotive environment while providing support for fast motion and various intrinsic and extrinsic camera capabilities within the bounds of the computational needs of optical flow calculation.

Embodiments of the present disclosure involve using a motion model developed for the unique aspects of automotive applications, as described in more detail below with respect to the Figures. For example, models described herein include limited degrees of freedom in motion, support for a variety of camera orientation and lens distortion characteristics, the potential availability of inertial measurement units accurately describing vehicle and, consequently, camera motion under challenging lighting and imaging conditions. Motion models described herein may be used to derive a dense global motion field. This field can be used in several ways to augment or assist the optical flow calculation. A first method is fusion where a dense global motion field is combined with an alternate optical flow estimation, either through classical methods or machine learning-based methods, to provide an improved optical flow field result. A second method is to use the global motion field to provide search candidates to a dense flow estimation algorithm that results in reduced complexity, such as by specifying a search center. A third method is to pre-warp images to remove the effects of global motion prior to applying an alternate motion estimation method. This may be particularly useful to reduce the complexity of machine learning-based methods, as the camera orientation and motion of static objects due to camera movement are removed before the operation of a machine learning method. A fourth method is to guide the search along one-dimensional or substantially one-dimensional search regions rather than using more complex two-dimensional search areas. For example, either a restricted search or modified penalty term may be used to account for known one-dimensional motion of static world points.

In a particular example, a pixel corresponding to a real-world point is identified in a first image captured by a camera associated with a moving vehicle, and techniques described herein are used to determine a location of the real-world point in a second image captured by the camera subsequently to the first image. According to certain embodiments, known parameters associated with the camera are used to constrain a search for the particular point in the second image. For example, a height of the camera from the ground may be used to project a plane onto the first image at a height associated with the real-world point, and a vector for the real-world point may be determined based on the plane. For example, the vector may lie along the plane, and may represent a one-dimensional direction in which the real-world point is expected to travel in subsequent images. A magnitude of the vector may be based on a speed at which the vehicle is moving (e.g., determined based on an accelerometer associated with the vehicle). The vector may be used to constrain a search for a pixel corresponding to the real-world point in the second image, such as by limiting the search to pixels that fall along or near the vector, by penalizing candidate pixels that do not fall along or near the vector, using the vector as a starting point for a search, comparing results of an alternative search technique to the vector as a confidence check, and/or the like.

Furthermore, distortion in the images that results from parameters of the camera, such as lens distortion from a wide-angle lens, may be accounted for using various techniques. For example, one or more formulas may be applied based on the known parameters of the camera in order to reduce or remove the distortion from the images prior to analysis.

Embodiments of the present disclosure overcome many challenges associated with conventional techniques. For example, by intelligently focusing a search for a point in a series of images from a moving camera based on an expected vector of movement for the point, techniques described herein reduce the amount of computing resources required to perform the search and produce more accurate results. Embodiments of the present disclosure may allow flow motion to be determined even in poor environmental and/or lighting conditions through intelligent prediction of pixel movement. By utilizing known information about the camera and its movement, techniques described herein improve efficiency and accuracy of a flow motion model based on data that is readily available. For example, by projecting a plane into an image based on a known height of a camera from the ground and generating a vector for a given point based on the plane and a speed at which the camera is moving, a search space may be reduced or focused on a subset of pixels most likely to correspond to the given point. Furthermore, by applying one or more formulas to account for radial distortion produced by wide-angle lenses, techniques described herein allow flow motion to be accurately determined even with distorted images produced by irregular camera lenses.

Motion Model

Figure 1D:
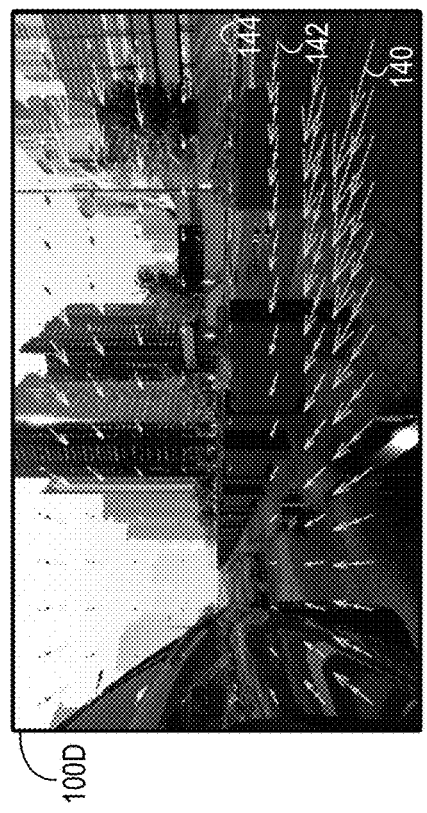
Figure 1A:
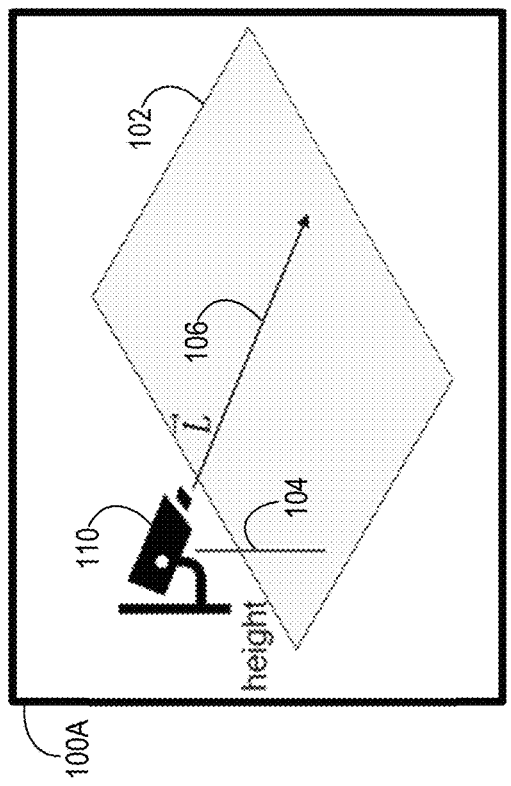
FIG. 1A depicts aspects of a camera related to global motion modeling.

FIG. 1A depicts a camera 110 at a height 104 from a plane 102 corresponding to the ground and pointing in a direction 106.

In vehicle applications, the translational motion of the camera may be significant and may dominate the flow field. Rather than assuming the translation is zero or that the depth of the scene is constant as would be needed for a projective model to give global constants, a general translation motion is considered. Furthermore, the height 104 above the ground plane 102 is considered fixed when deriving the motion model rather than assuming the depth in the scene is constant.

The model assumes a camera 110 attached to a vehicle with fixed pitch and yaw orientation angles relative to the vehicle. The vehicle moves in a plane along a 1-D curve. It is noted that the minimum turning radius and maximum yaw rate at high speed, constrain the motion. The yaw of the camera 110 is fixed relative to the vehicle but can change relative to the real-world as the yaw of the vehicle changes.

The form of a motion model in the pixel domain at a pixel with row r and column c may have the following form shown in Equation 1.

Equation 1 Form of Pixel Domain Motion Model $$\frac{\partial r}{\partial t} = \alpha \cdot (r - r_{horizon})^2 + \beta \cdot \left(c - \frac{W}{2}\right) \cdot (r - r_{horizon})$$

$$\frac{\partial c}{\partial t} = \alpha \cdot \left(c - \frac{W}{2}\right) \cdot (r - r_{horizon}) + \beta \cdot \left(c - \frac{W}{2}\right)^2 + \beta \cdot f^2$$

The image width in pixels is W, the row of the horizon is $r_{horizon}$, and the camera focal length is f in pixels. The horizon row describes the pitch of the camera. For example, if the camera were horizontal the horizon row would correspond to the middle of the image.

The values of parameters alpha and beta depend on the motion dynamics of the vehicle, combining motion and extrinsic camera orientation. The three-dimensional (3D) world motion is described with only two degrees of freedom, i.e., speed and yaw rate. Considering the projection at different camera pitch and yaw orientation and the spatial variation caused by projection of the spatial distribution of motion appears particularly complex.

Figure 1C:
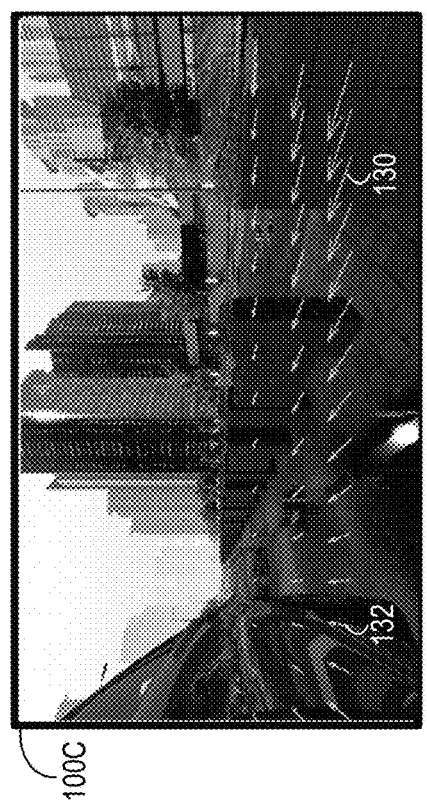

FIG. 1B illustrates an image 100B captured by a camera, such as camera 110, at a first orientation (e.g., a center view) and FIG. 1C illustrates an image 100C captured by a camera, such as camera 110, at a second orientation (e.g., a left side view).

In FIG. 1B, the forward view pixels below the horizon move downward (e.g., in a series of consecutive images as the camera moves), as illustrated by arrow 118. Pixels on the right side of the image move right, as illustrated by arrow 120. Pixels on the left side of the image move left, as illustrated by arrow 116.

In FIG. 1C, illustrating an image captured by a left side view camera, pixels on the left generally move up (e.g., in a series of consecutive images as the camera moves), as illustrated by arrow 132. Pixels on the right side of the image move primarily to the left, as illustrated by arrow 130.

Considering the known property of a projective transformation that lines are mapped to lines, the direction of the pixel domain flow is independent of the height above ground or of the speed of the camera. This attribute may be used to reduce a two-dimensional (2D) search to a one-dimensional (1D) or substantially 1D search along the flow direction.

FIG. 1D illustrates an image 100C captured by a camera, such as camera 110 (e.g., from the same orientation as image 100C of FIG. 1C).

Accounting for Lens Distortion

For an image captured by a camera, the direction from the optical axis of the camera corresponds to the distance from the center of the image. This may be modified slightly in cases where the optical axis does not correspond exactly with the pixel in the center of the image. For example, for a pinhole camera, this relation is given by a tangent function relating to the camera focal length, the distance from the center, and the angle from the optical axis.

$$\frac{r}{\text{focal\_length}} = \tan(\theta)$$

The focal length, in units of pixels, may be determined from the viewing angle of the camera:

$$\frac{\frac{W}{2}}{\text{focal\_length}} = \tan\left(\frac{FOV}{2}\right) \Rightarrow \text{focal}_{length} = \frac{W}{2}/\tan\left(\frac{FOV}{2}\right)$$

For a wide-angle camera that produces images with radial distortion, the viewing angle theta is still related to the radial distance r but a more general relation may apply. For instance, a polynomial may describe the ratio between the viewing angle and the radius.

Figure 2:
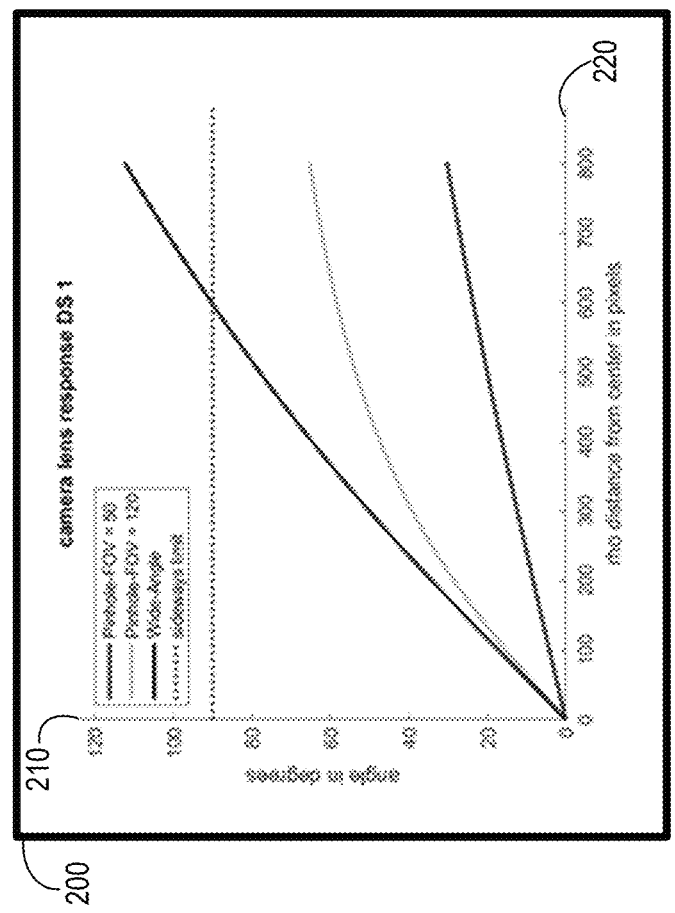
FIG. 2 depicts an example of a plot related to global motion modeling.

The plot 200 illustrated in FIG. 2 compares the relation between a first parameter represented by axis 210 that comprises the angle in degrees from the optical axis and a second parameter represented by axis 220 that comprises the distance rho from the image center, for three different pinhole cameras with two different field of view (FOV) parameters and a third wide-angle camera that can capture images of greater than 90 degrees (e.g., "look behind").

An analytical solution supporting various radial lens distortions is not particularly useful. What is useful instead is to compute the optical flow using the lens distortion model to convert between a warped image and spatial coordinates.

Figure 3B:
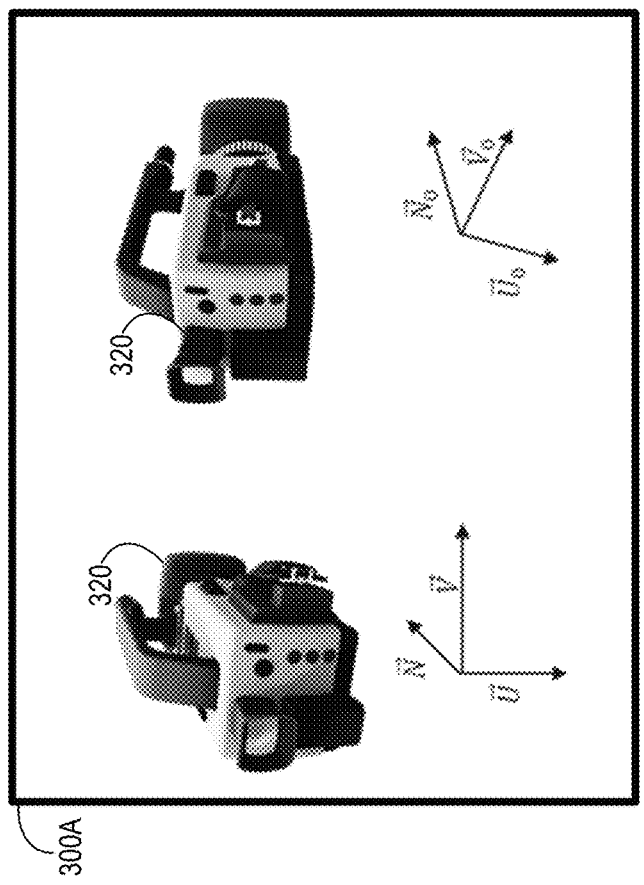
FIGS. 3A-3D depict examples related to computing an optical flow.
Figure 3A:
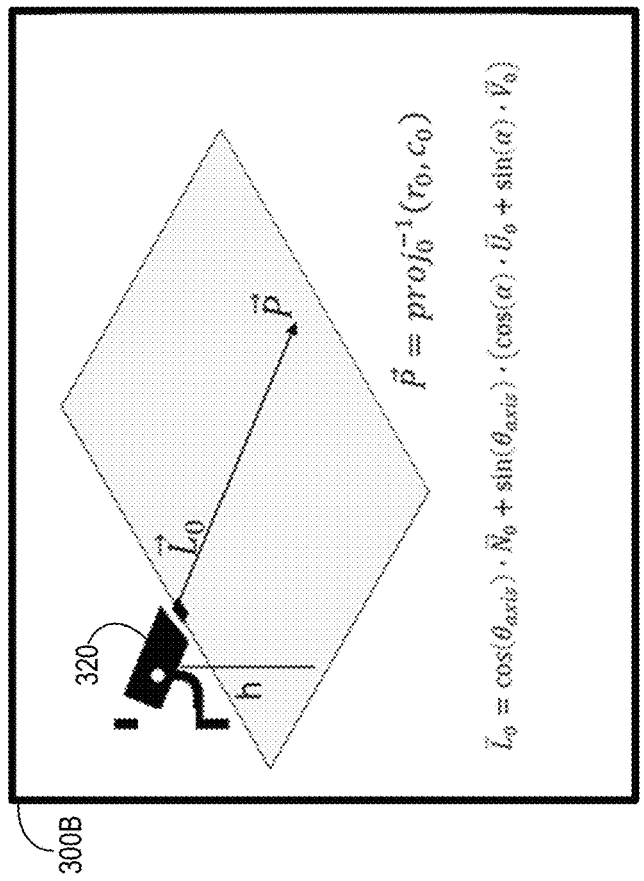

FIG. 3A is an illustration 300A of an initialization of an approach for converting between a warped image and spatial coordinates. In FIG. 3A, three vectors are computed defining the orientation $\{\vec{N}, \vec{U}, \vec{V}\}$ of a camera 320, where $\vec{N}$ is the camera normal, $\vec{U}$ points vertically downward and V points in the horizontal direction. The set of vectors $\{\vec{N}, \vec{U}, \vec{V}\}$ is then rotated according to the orientation of camera 320 giving vectors $\{\vec{N}_0, \vec{U}_0, \vec{V}_0\}$.

A radial distortion model is used to define the relation between rho and the angle from optical axis theta and the relation between cos(theta) and rho: RhoToTheta and CosThetaToRho.

Figure 3D:
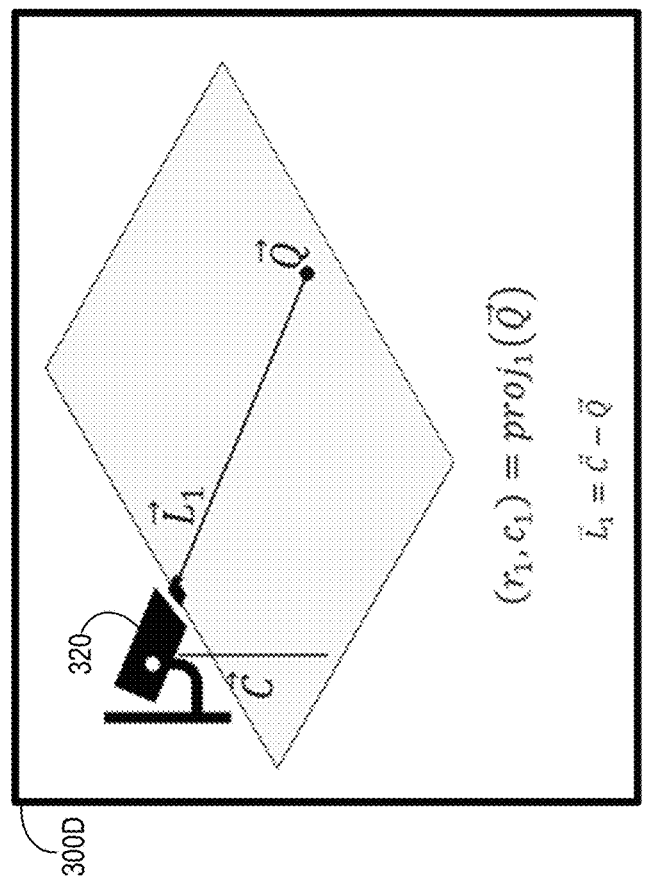
Figure 3C:
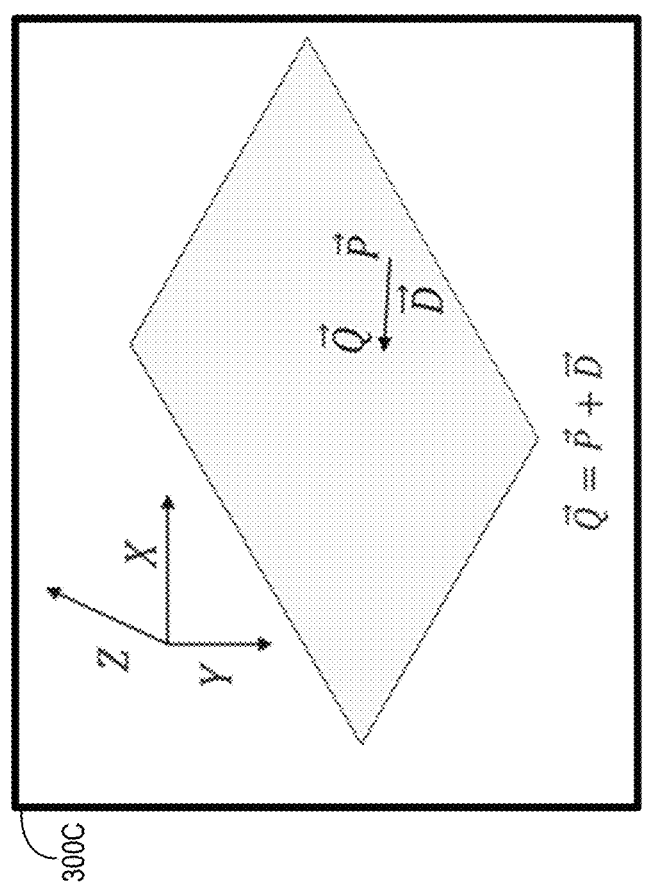

FIG. 3B, FIG. 3C, and FIG. 3D are illustrations 300B, 300C, and 300D of a process for computing the optical flow at an image point (r0, c0) due to a camera 320 of height h moving on a vehicle with translation displacement by $\vec{D}$ and yaw change $\Delta\theta$.

Computing the optical flow at an image point (r0, c0) due to a camera of height h moving on a vehicle with translation displacement by $\vec{D}$ and yaw change $\Delta\theta$ may involve the following steps.

The first step may be to convert image pixel location (r0, c0) to a 3D spatial point $\vec{P}$ in the driving plane using inverse projection line intersection with plane of height zero, as shown in FIG. 3B. In particular, FIG. 3B illustrates the inverse projection of camera pixel (r0, c0) to 3D point $\vec{P}$.

The second step may be to apply motion in 3D according to the vehicle displacement $\vec{D}$ to move point $\vec{P}$ to point $\vec{Q}$, as shown in FIG. 3C. In particular, FIG. 3C illustrates motion of a 3D point due to a displacement vector.

The third step may be to rotate the camera basis according to vehicle yaw change $\Delta\theta$ from $\{\vec{N}_0, \vec{U}_0, \vec{V}_0\}$ to $\{\vec{N}_1, \vec{U}_1, \vec{V}_1\}$.

The fourth step may be to convert the $\vec{Q}$ to a different pixel location (r1, c1) using projection of rotated basis $\{\vec{N}_1, \vec{U}_1, \vec{V}_1\}$, as shown in FIG. 3D. In particular, FIG. 3D illustrates a projection using a rotated bases from point $\vec{Q}$ to pixel (r1, c1).

The fifth step may be to compute the pixel domain optical flow as is the difference in the pixel positions (r1,c1)−(r0, c0).

Specific steps may include the following.

Given motion parameters speed and yaw rate, the camera frame rate is used to calculate a displacement $\vec{D}$ due to speed and an orientation change $\Delta\theta$ from the yaw_rate and time between frames, i.e., 1/frame rate. The basis $\{\vec{N}_0, \vec{U}_0, \vec{V}_0\}$ is rotated to a new orientation $\{\vec{N}_1, \vec{U}_1, \vec{V}_1\}$, due to this additional rotation of the camera. The optical flow at a pixel in the image is computed by the following steps.

Given pixel row and column (r0, c0), the distance rho in pixels is computed from the center of the image and a corresponding angle alpha representing the pixel (r0, c0) in polar coordinates (rho, alpha) with the origin at the center of the image. The radial distortion model is used to compute the angle, $\theta_{axis}$, from the camera optical axis, theta.

A line-in-space is constructed based at the location of the camera and pointed in the direction given by the angle theta from the optical axis and the polar angle alpha.

$$\vec{L}_0 = \cos(\theta_{axis}) \cdot \vec{N}_0 + \sin(\theta_{axis}) \cdot (\cos(\alpha) \cdot \vec{U}_0 + \sin(\alpha) \cdot \vec{V}_0)$$

It is then determined where the line intersects a plane at the height of the camera to determine a constant k. If k<0, the point is above the horizon, and k is set to a large value such as 10000.

The point in the driving plane corresponding to the pixel is given by $\langle X_0, Y_0, Z_0 \rangle = k \cdot \vec{L}_0$. The point in 3D space is moved by the displacement computed from the motion parameters to give $\langle X_1, Y_1, Z_1 \rangle = \vec{D} = \langle X_0, Y_0, Z_0 \rangle$.

The modified point is projected back to the image pixels using the rotated basis $\{\vec{N}_1, \vec{U}_1, \vec{V}_1\}$. Specifically, the $\vec{L}_1$ normalized vector is computed between the origin and the modified point $$\vec{L}_1 = \frac{1}{\sqrt{X1^2 + Y1^2 + Z1^2}} \cdot \langle X_1, Y_1, Z_1 \rangle.$$

The cosine of the angle between the line and the camera optical axis from the inner product of camera normal $\vec{N}_1$ and $\vec{L}_1$ is computed. Specific steps further involve computing the modified value of rho1 from this angle via CosTheta-ToRho. The polar angles between the line and the rotated camera vectors $\vec{U}_1$ and $\vec{V}_1$ as cos(alpha1)=<$\vec{L}_1$, $\vec{U}_1$>/sin(theta) and sin(alpha1)=<$\vec{L}_1$, $\vec{V}_1$>/sin(theta) are also computed. The steps further comprise computing the coordinates of the image point relative to the origin at the center of the image u1=rho1*cos(alpha1) and v1=rho1*sin(alpha1). The modified row and column r1,c1 are also computed by adding offsets to change the origin to the top left of the image rather than the middle. Finally, the optical flow is computed as the difference (r1,c1)−(r0,c0).

Basis Flow Implementation

In general, the calculation of the flow model described herein involves the use of the camera and motion parameters to determine the optical flow at each pixel of the image. A computational approximation set forth below involves computing a basis flow corresponding to each motion degree of freedom (there are two motion degrees of freedom in an automotive context, driving/speed and turning/yaw_rate). Given the basis flows for the two parameters speed and yaw_rate, the motion from a point A to a point C can be determined by varying a first parameter, speed, to get an intermediate point B and then varying the second parameter, yaw_rate, to move to the final point C. The relation between these three points and the corresponding flows is given by:

$$\vec{C} = \vec{A} + \text{Flow}_1(\vec{A}) + \text{Flow}_2(\vec{B})$$

For a continuous flow, the rotational flow due to yaw_rate is roughly constant:

$$\vec{C} \approx \vec{A} + \text{Flow}_0(\vec{A}) + \text{Flow}_1(\vec{A})$$

For a pinhole camera, lines are preserved with the result that the flow at a pixel is proportional to the parameter magnitude.

For a lens with radial distortion this property may not hold exactly but is approximately true.

$$\text{Flow}_0(\vec{X}) = \text{speed} \cdot \text{Basis}_0(\vec{X})$$

$$\text{Flow}_1(\vec{X}) = \text{yaw\_rate} \cdot 1(\vec{X})$$

Combining these relations, the flow can be approximated by:

$$\text{Flow}_{total}(\vec{A}) = \vec{C} - \vec{A} \approx \text{Flow}_0(\vec{A}) + \text{Flow}_1(\vec{A})$$

Thus, the following equation may be used to determine the total flow from basis and parameters:

$$\text{Flow}_{total}(\vec{A}) \approx \text{speed} \cdot \text{Basis}_0(\vec{A}) + \text{yaw\_rate} \cdot \text{Basis}_1(\vec{A})$$

In the relation equation above, the total flow at a pixel location A is given by a weighted combination of two basis flows with weights depending on the motion parameters speed and yaw_rate. In this formulation, the basis flows only need to be computed once for a video sequence.

FIGS. 4A, 4B, 4C, and 4D depict example basis flow fields 400A, 400B, 400C, and 400D. Each of FIGS. 4A-4D depicts an example of using the basis flow images to produce a general flow.

Figure 4A:
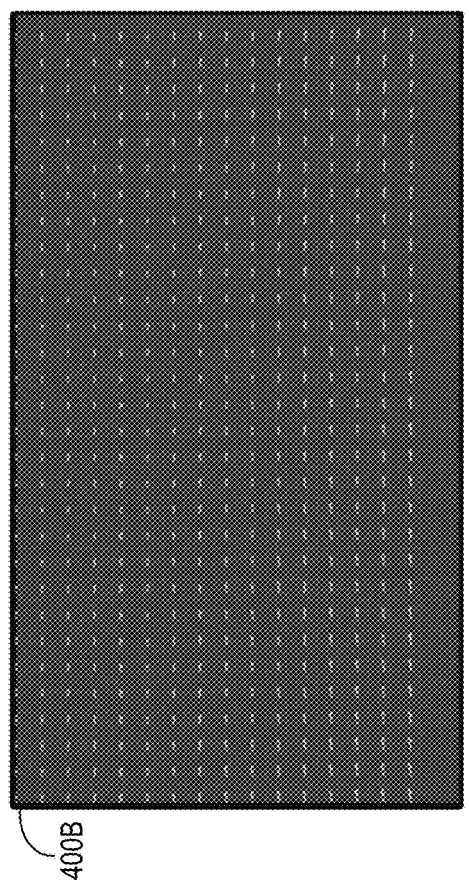
FIGS. 4A-4D depict example flow fields.
Figure 4B:
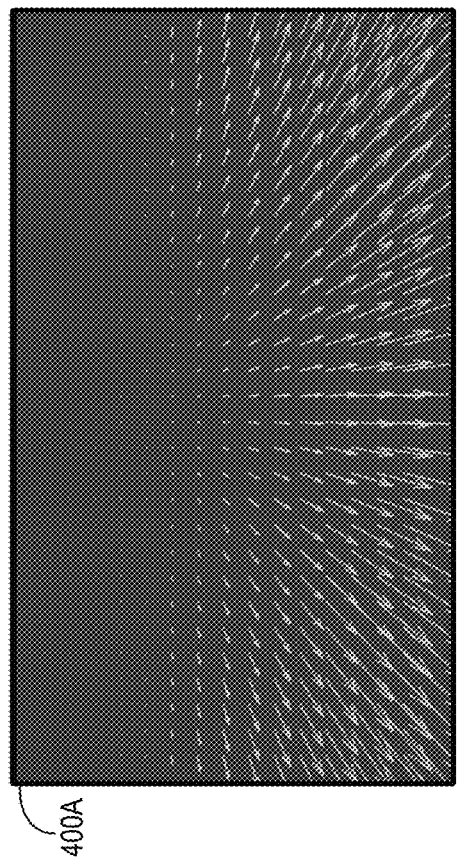

In FIG. 4A the vehicle is barely turning (e.g., the basis flow corresponds to speed only), while in FIG. 4B a right turn is executed by the vehicle (e.g., the basis flow corresponds to turning only). In each case, the total flow is computed by taking a weighted sum of the basis flows shown previously.

Figure 4D:
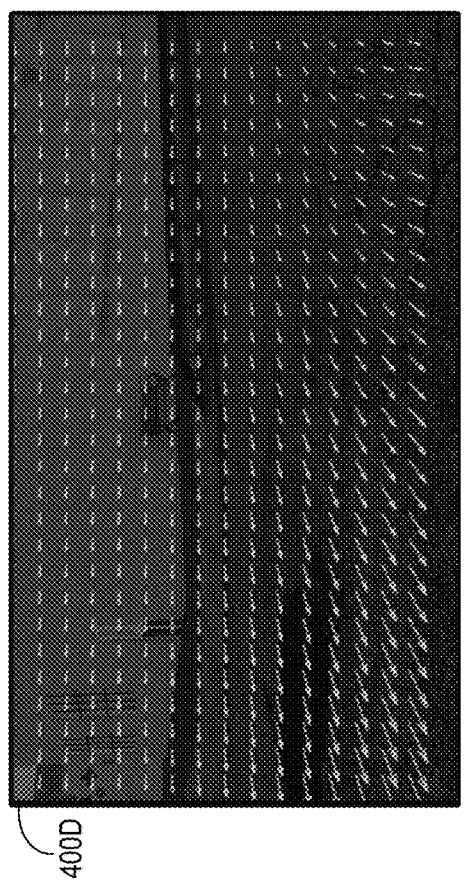
Figure 4C:
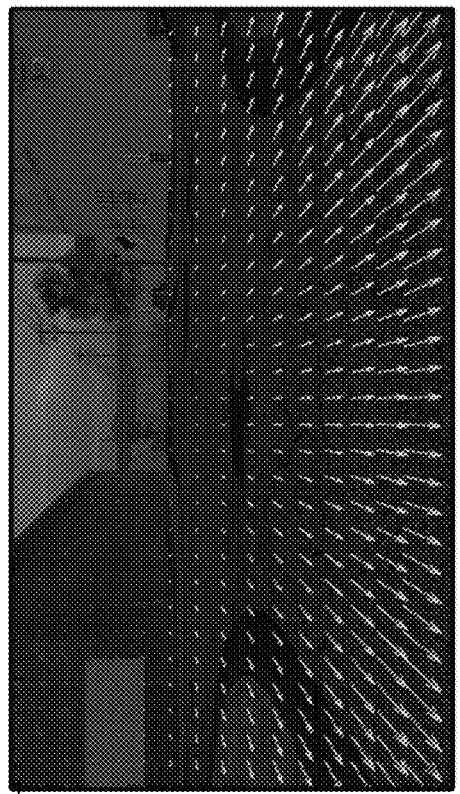

In FIG. 4C, the basis flow corresponds to a speed of 9.522 m/s and a yaw rate 0.04 degrees/s. In FIG. 4D, the basis flow corresponds to a speed of 4.775 m/s and a yaw rate of −27.72 degrees/s.

The pure "rotation only" second basis function may not be realizable by a vehicle with a positive minimum turning radius. It is possible to replace this basis flow with a realizable flow if desired. When estimating motion parameters, a minimum turning radius constraint can be imposed.

Using the basis flow fields, a general flow field for given speed and yaw rate is computed with a low complexity, involving two multiplications and one addition per component for each pixel. Thus, a total of four multiplications and two additions per image pixel are needed. This method requires precomputation of the basis flow images and storage to hold the basis flow images. It is possible to compute the flow at a reduced resolution and then up sample as needed for the application, such as to reduce storage and computation requirements.

Two basis functions may be used, as the motion primarily has two degrees of freedom. This method may be generalized to have three or more basis flows corresponding to additional motions under investigation.

These examples are shown without radial distortion for clarity, though the same technique may be used when the basis flow images are computed based on radial distortion.

Determining Model Parameters

There may be cases where camera intrinsic and extrinsic parameters are known but the dynamic motion of the camera is not known or is unused. An inertial measurement unit (IMU) may provide motion information in some cases. In the analytic model, speed and yaw rate determine the motion parameters analytically. The model computation supporting distorted lenses relies on displacements rather than direct speed and yaw rate values. In computing these offsets, the speed and yaw rate may be used to define a circular path with constant speed. The camera frame rate defines a time interval and position, and angular displacement may be computed.

Certain embodiments assume that the camera is located at the center of vehicle motion. In practice the camera may be translated slightly from the origin used for the vehicle (e.g., side mirror or similar).

Figure 5B:
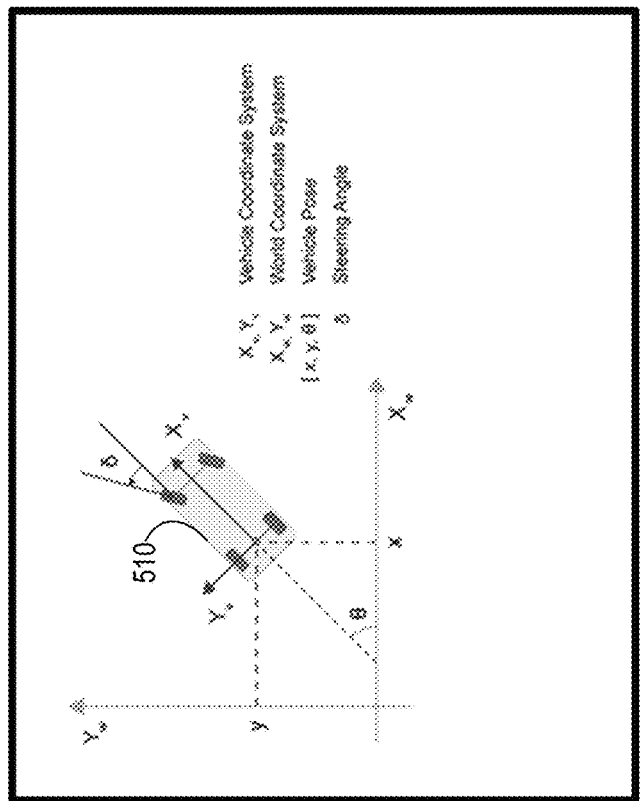
FIGS. 5A and 5B depict examples related to a vehicle moving between points on a circle while a camera located the front of the vehicle has a parallel displacement.
Figure 5A:
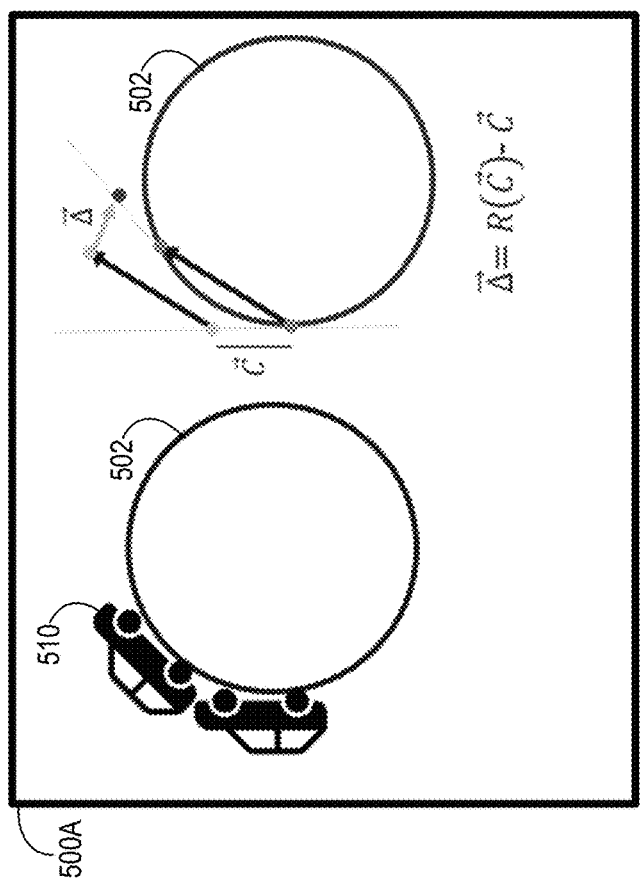

FIG. 5A is an illustration 500A of a vehicle 510 moving between points on a circle 502 while a camera located the front of the vehicle has a parallel displacement. In addition, the vehicle rotates, which can be applied after the translation when analyzing the motion path. This rotation does not move a camera which is located on the center of rotation of the vehicle, but an offset $\vec{\Delta}$ is introduced because of rotating the vehicle and the camera having an offset. The additional translation can be calculated as the difference between the rotation of the relative camera position and the camera position. In some embodiments, the motion, speed, yaw-rate, and camera offsets may be expressed relative to the standard ISO 8855, as depicted in FIG. 5B.

For example, FIG. 5B is an illustration 500B of the ISO 8855 coordinates with respect to vehicle 510. Utilizing the ISO 8855 coordinates may allow techniques to be generalized for cooperation among different vendors/organizations.

Reliance on the IMU data can be eliminated while still using the underlying motion model. For example, this may involve estimating the motion parameters of the current frame from results from local flow calculations or prior frames. Due to inertia of the vehicle, the motion parameters will be similar between frames. Additionally, the estimates may be filtered in time to remove outliers and prevent rapid change.

Camera parameters are known and are used to define the motion model. However, there are two unknown factors: the speed and rate of turn. As such, an estimation process computes two basis images as described above. A spatial region of the image is selected, and samples of the motion vector components are collected. A typical use involves a rectangular area in front of the car for a forward-facing camera. The samples used for parameter estimation may be limited by a confidence measure so that only high confidence values (e.g., values with confidence measures exceeding a threshold) are used in the estimation process.

The collected samples of pixel location p and a flow vector with two components may be assembled into a linear least squares problem. In an ideal case, the flow at each pixel will be related to the basis flow at the same pixel location by a linear relationship. This can be organized into a linear estimation problem by the following equation, where subscripts h and v denote horizontal and vertical components of a measure flow F, and basis flows $Basis_0$ $Basis_1$. The vector p corresponds to the point where the sample is collected. The variable $x_0$ corresponds to the speed and $x_1$ corresponds to the yaw_rate. Thus, the estimation problem may be formulated as follows:

$$\begin{bmatrix} F_h(\vec{p}) \\ F_v(\vec{p}) \\ \vdots \end{bmatrix} = \begin{bmatrix} Basis_{0,h}(\vec{p}) & Basis_{1,h}(\vec{p}) \\ Basis_{0,v}(\vec{p}) & Basis_{1,v}(\vec{p}) \\ \vdots & \vdots \end{bmatrix} \begin{bmatrix} x_0 \\ x_1 \end{bmatrix}$$

This is of the form of known matrix inversion problems.

$$\vec{Y} = M \cdot \begin{bmatrix} x_0 \\ x_1 \end{bmatrix}$$

$$\begin{bmatrix} x_0 \\ x_1 \end{bmatrix}$$

The well know solution MSE solution for given Y and M is:

$$\begin{bmatrix} x_0 \\ x_1 \end{bmatrix} = (M^T M)^{-1} \cdot M^T \cdot \vec{Y}$$

This minimal MSE estimator is determined by the selection of samples to use, the sample values, and the basis flow values at the sample points.

Estimating Motion Parameters from Local Pixel Values

The motion parameters of the motion model are estimated based on comparing pixel values rather than relying on prior flow calculations. Inputs to the estimation include current and prior images $I_n$, and two basis flows $Basis_0$ $Basis_1$ as discussed above. The steps may include selecting a spatial region R to use for estimating motion parameters and selecting a range of possible motion parameters, i.e., (speed, $yaw_{rate}$)∈[S0, S1]×[Y0, Y1]. This may be limited in some embodiments to valid combinations to reduce computation. The motion parameter vector $\vec{s}$ and the basis flows may be determined by the formula set forth below for calculating flow due to motion parameter vector $\vec{s}$ at pixel location $\vec{p}$.

$$\vec{F}(\vec{s},\vec{p}) = \vec{s}_0 \cdot Basis_0(\vec{p}) + \vec{s}_1 \cdot Basis_1(\vec{p})$$

For each motion vector of motion parameters $\vec{s}$, the steps may include computing a cost function by summing over pixel location in the region R of the error between values of the prior frame at p and the value at the current frame at the pixel resulting from the flow defined by the parameters, as shown in the formula set forth below for calculating cost due to motion parameter vector $\vec{s}$.

$$Cost(\vec{s}) = \sum_{\vec{p} \in R} \left| I_n(\vec{p}) - I_{n+1}(\vec{p} + \vec{F}(\vec{s},\vec{p})) \right|$$

The steps may further include selecting the motion parameter vector that gives minimal cost. The motion parameter vector may optionally be limited to a valid range as described above.

Estimating Motion Parameters from Local Pixel Values

Several physical constraints may be used to limit the valid region of motion parameters. The following are examples of additional constraints which may be imposed on initial estimated values: minimum turning radius; maximum acceleration due to turn; maximum speed (e.g., different forward and reverse); limited difference from prior speed/yaw rate values; and/or the like.

It is possible that the determined parameter values may be infeasible as violating one or more of known limits. For instance, a real-world vehicle typically has a minimum turning radius and so cannot have a positive yaw-rate and zero speed. As such, the yaw-rate will be limited at low speed. Similarly, at high speed, rapid turns will give unacceptable acceleration. As such, the yaw rate will be limited as the speed increases. These limits can be imposed by processing the direct MSE parameter estimates to limit them to feasible ranges.

As an example of limitation, consider a minimum turning radius, which is the tightest circle the vehicle can turn in. The motion becomes:

$$\vec{X}(t) = R_{min} \cdot \langle \cos\left(\frac{\pi}{180} \cdot \text{yaw\_rate} \cdot t\right), \sin\left(\frac{\pi}{180} \cdot \text{yaw\_rate} \cdot t\right)\rangle$$

$$\vec{V}(t) = \frac{\partial \vec{X}(t)}{\partial t} =$$

$$R_{min} \cdot \frac{\pi}{180} \cdot \text{yaw\_rate} \cdot \langle -\sin\left(\frac{\pi}{180} \cdot \text{yaw\_rate} \cdot t\right), \cos\left(\frac{\pi}{180} \cdot \text{yaw\_rate} \cdot t\right)\rangle$$

$$|\text{speed}| = |\vec{V}(t)| = R_{min} \cdot \frac{\pi}{180} \cdot |\text{yaw\_rate}|$$

$$|\text{speed}| \geq R_{min} \cdot \frac{\pi}{180} \cdot |\text{yaw\_rate}|$$

The maximum acceleration due to turning may be limited. For motion in a circle of radius R at speed S, the acceleration is S^2/R. If an upper limit is given, a relation on the speed can be derived when turning on the circle determined by the yaw rate.

$$A_{max} \geq \frac{|\vec{V}(t)|^2}{R} \Rightarrow A_{max} \geq \frac{|\vec{V}(t)|}{R} \cdot |\vec{V}(t)| \Rightarrow A_{max} \geq \frac{\pi}{180} \cdot |\text{yaw\_rate}| \cdot |\vec{V}(t)|$$

Two families of constraints on the speed are identified:

$$|\text{speed}| \geq R_{min} \cdot \frac{\pi}{180} \cdot |\text{yaw\_rate}|$$

$$A_{max} \geq \frac{\pi}{180} \cdot |\text{yaw\_rate}| \cdot |\text{speed}|$$

Figure 6:
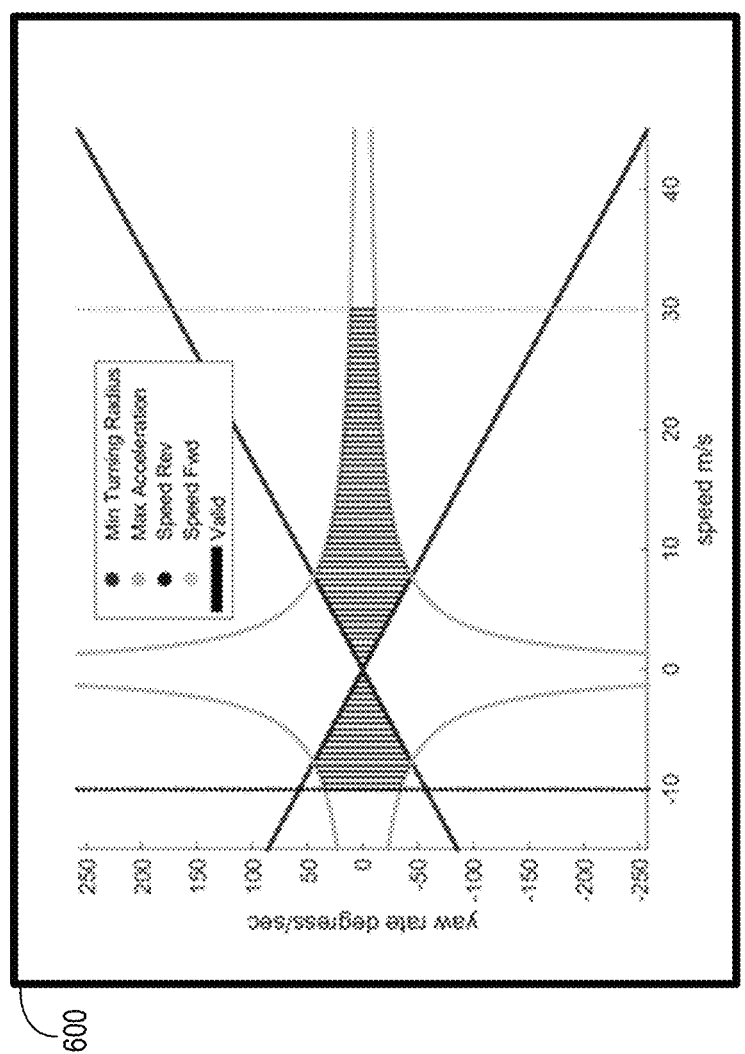
FIG. 6 depicts an example of a plot related to global motion modeling.

These constraints are illustrated graphically by plot 600 in FIG. 6, which illustrates the valid set of speed and yaw rate combinations. These constraints may be applied to improve the estimate or to limit the search range when estimating motion parameters. Given values for speed and yaw_rate, the constraint is imposed by mapping a pair (speed, yaw_rate) that is outside of the constraint to the same speed but smaller |yaw_rate| satisfying the inequality.

Additionally, the parameters will not change suddenly in time. A temporal median filter can be used to remove outliers while a smoothing filter may be used to limit speed of variation. In the case of a parameter search, the search may be centered around the parameters from the prior frame with a limited search range.

Information from other cameras may also be used. In typical operation, the forward-facing camera may be used to estimate the motion parameters. These parameters may be used when processing other camera views. Additional cameras such as the rear-view camera may be used to help form the parameter estimate, such as when the front view estimate is invalid or has low confidence. Such an example is when the vehicle is stopped but pedestrians and local motion cause the estimated flow to suggest invalid motion when relying on the forward-facing camera only.

The motion model described herein is valuable in providing global motion estimation appropriate for the automotive domain. The description of the model and parameter estimation are discussed above. In the following sections, certain applications of the model and parameter estimation are discussed.

Fusion of Optical Flow

The fusion application uses the global motion field from the motion model to modify a separate local flow estimation algorithm. In many cases, such as low light, shadows, little texture, etc., the local motion estimate may not be accurate, and the global motion flow will be inaccurate when there is local motion but may be quite accurate even in low-light if the IMU is used to determine the motion parameters. An outline of the operation is shown in FIG. 7.

Figure 7:
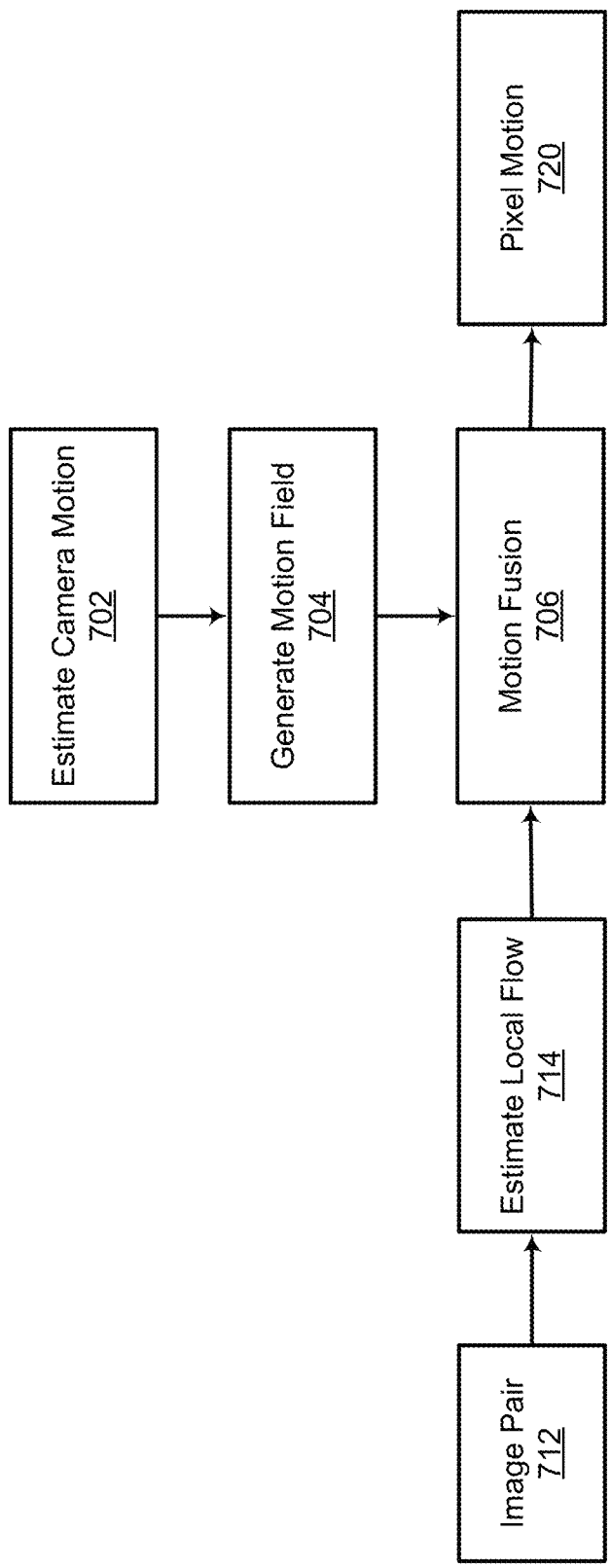
FIG. 7 depicts an example fusion operation.

FIG. 7 illustrates an example fusion operation.

At step 702, camera motion is estimated. At step 704, a motion field is generated.

At step 712, an image pair is determined, and at step 714 local flow is estimated based on the image pair.

At step 706, motion fusion is performed based on the local flow and the motion field.

At step 720, pixel motion is determined based on the motion fusion.

Various fusion methods may be used, and only certain examples are described herein. The motion model assumes ground at zero height. For objects with different height, the local flow will have the same direction but differ in magnitude, and this fact may be utilized when designing the fusion algorithm.

For fusion, it may be assumed that local flow and the motion model flow are defined at each pixel. A cost function is defined for the flow vectors and the lower cost vector is selected for fusion. In this discussion, different methods will differ in how the cost function is defined.

$$\text{Fusion}(\vec{p}) = \begin{cases} L(\vec{p}) & \text{Cost}_{local}(\vec{p}, L(\vec{p})) < SAD(\vec{p}, CMM(\vec{p})) \\ CMM(\vec{p}) & \text{else} \end{cases}$$

For a value of N, e.g., N=3, N=8, the block SAD is defined at each point p for a given vector v as:

$$SAD(\vec{p}, \vec{v}) = \sum_{\vec{r} \in [-\frac{N}{2}, \frac{N}{2}] \times [-\frac{N}{2}, \frac{N}{2}]} |I(\vec{p} + \vec{r}) - J(\vec{p} + \vec{r} + \vec{v})|$$

Additive Penalty Term

Figure 8:
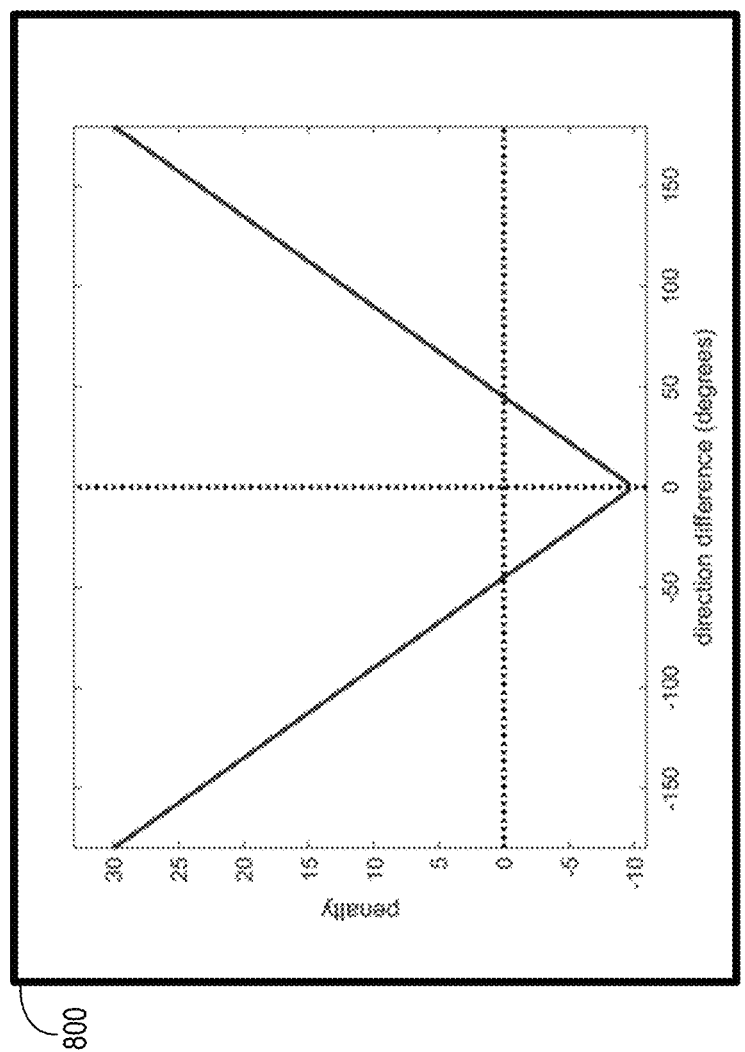
FIG. 8 depicts an example of a cost penalty.

FIG. 8 is an illustration 800 of an example of a cost penalty. The cost of a flow vector is the sum of the SAD and a penalty term. For the local motion, the penalty term is based on the difference in direction between the motion model (p) and the vector under test v. For vectors in the same direction, possibly differing in magnitude from the motion model, the penalty term may be negative for the local motion. In this case local motion that is in the same direction as the motion model is preferred. Local motion that is not in the same direction as the motion model has a penalty but may still be selected in fusion if the local motion gives sufficient SAD cost savings to offset the penalty.

Multiplicative Weighting Term

The cost of a flow vector is the SAD scaled by a weight term. The weight term is based on the difference in direction between the motion model ($\vec{p}$) and the vector under test, $\vec{v}$. For vectors in the same direction, possibly differing in magnitude from the motion model, the weight term may be less than one for the local motion. In this case local motion that is in the same direction as the motion model is preferred. Local motion that is not in the same direction as the motion model has a weight term that is greater than one. Fusion will select the local motion and give sufficient SAD cost savings to offset the weight.

$$\text{Cost}_{local}(\vec{p},\vec{v})=\text{Weight}(\vec{v},\text{CMM}(\vec{p}))\cdot\text{SAD}(\vec{p},\vec{v})$$

Search Candidates

The motion model process is used to provide a candidate to the local search rather than an alternate replacement, as with the fusion method.

Figure 9:
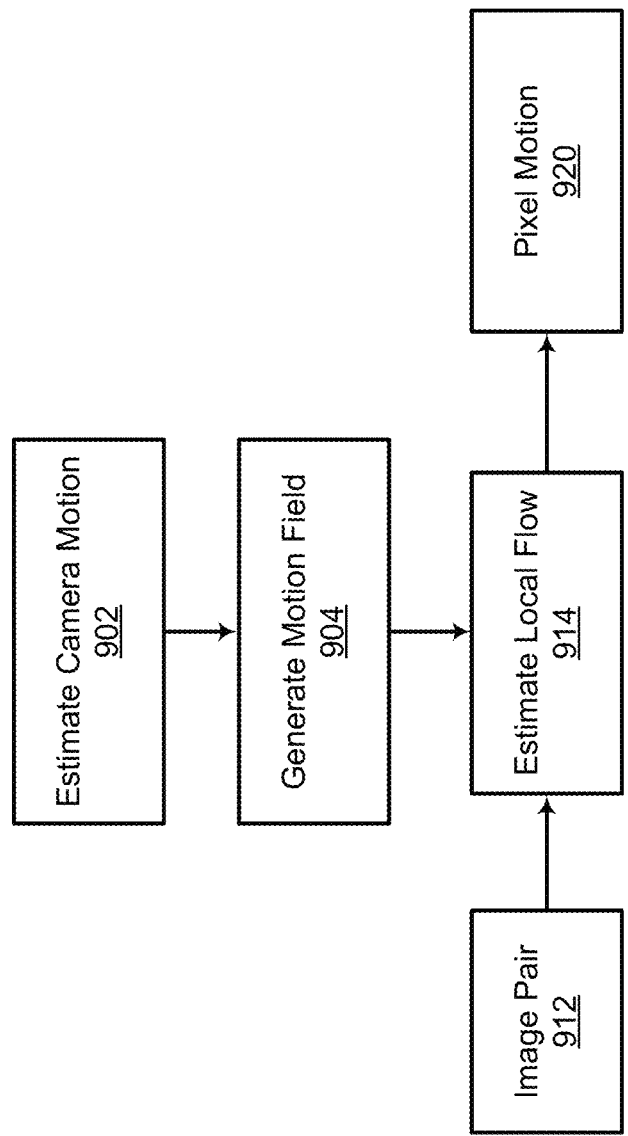
FIG. 9 depicts an example related to search candidates.

FIG. 9 illustrates an example related to search candidates. In this use case, the motion model generates a flow that is used during the local flow estimate, giving a candidate from the global motion to consider during search. For example, at step 902, camera motion is estimated and at step 904, a motion field is generated. At step 912, an image pair is determined, and at step 914, a local flow is estimated based on the image pair and the motion field (e.g., based on a candidate determined using the motion field) to determine pixel motion at step 920.

The candidate may be provided in the highest level of a multiresolution search. In the case of fast motion, the global motion field may have large motion vectors. The use of a global candidate avoids the need to significantly increase the search range used in the local flow estimate to consider these long motion vectors. The global motion field is spatially and temporally smooth as the structure of the model provides spatial smoothness and the limited change on the motion parameters provides smoothness in time. This smooth reference can assist the local flow in being smoother. Additionally, the motion model flow may be used to define the direction of motion, reducing a 2D search to a 1D search or a substantially 1D search in the indicated direction. This is motivated by the observation that the direction of pixel flow of a static object is fixed though the magnitude may differ based on static object height.

Modified Cost Function

In addition to providing search candidates, the cost function used to evaluate motion vector candidates during a search may be modified to include either a scaling factor or a penalty term depending upon the global motion vector. This is like the cost function used in the fusion of optical flows. This weight or penalty will bias decisions toward the global flow direction while still permitting local flow to deviate from the global flow if sufficient cost reduction is achieved. The prior penalty term discussed in fusion may be added to the SAD cost used during the local motion search to bias the search toward the flow direction determined by the global motion model flow:

$$\text{Cost}(\vec{p},\vec{v})=\text{Distortion}(\vec{p},\vec{p}+\vec{v})\text{++Penalty}(\vec{v}),\text{Global}(\vec{p}))$$

Pre-Warping

The objective of pre-warping is to remove know camera motion from the frame sequence before local flow estimation. This allows the local flow estimation to operate with low complexity either with respect to search range in traditional methods or network size in neural network-based approaches. In the neural network case, this is helpful when supporting a variety of camera orientations since the known camera orientation and global motion may be removed, reducing or avoiding the need to learn a range of possible camera operating modes. An additional benefit is the reduction in range of needed training data and conditions.

Figure 10:
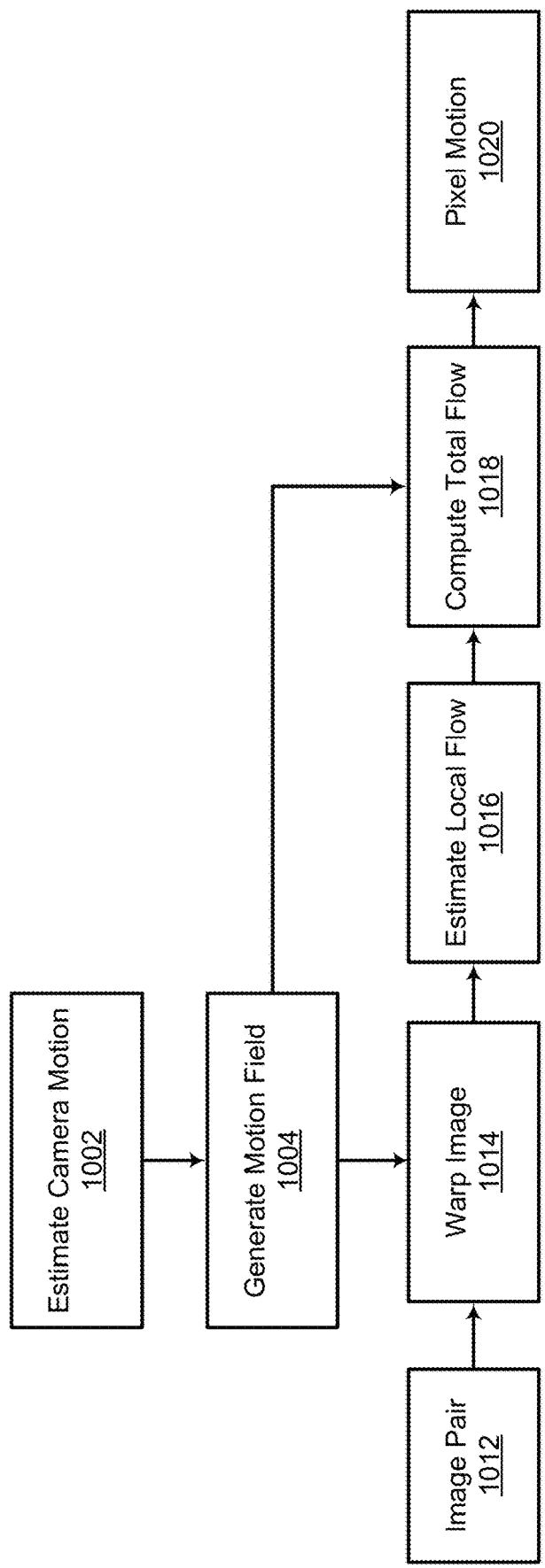
FIG. 10 depicts an example related to warping.

FIG. 10 illustrates an example related to warping. For example, at step 1002, camera motion is estimated and at step 1004, a motion field is generated. At step 1012, an image pair is determined, and at step 1014, the image is warped based on the motion field. At step 1016 a local flow is estimated based on the warped image, and at step 1018 the total flow is computed based on the local flow and the motion field. At step 1020, pixel motion is determined based on total flow.

In operation, a dense flow will be generated from the current frame to the prior frame. Using this dense global flow, the prior frame can be warped to a reference frame in which global motion is compensated away. The local motion will operate on the pair of frames consisting of the warped prior frame and the current frame. The total motion from prior frame to current frame will then be a combination of the global motion (prior to warping) and the estimated local motion (warped prior to current frame).

Search Guidance

The global motion field is due to two types of motion of the camera, rotation and translation. The pixel flow induced by rotation depends on the camera properties but is independent of the scene content, while the translation component depends upon the camera properties and motion but also the content of the scene. The pixel flow induced by translation can be produced by assuming a property of the scene such as a fixed constant depth or a constant height, as in the model described above. Although the pixel flow induced by translation depends on the scene content, at each pixel the direction of such flow is independent of the scene content. For a pinhole camera, this corresponds to the epipolar line known in computer vision. When cameras introduce distortion, this epipolar line corresponds to a 1D curve consisting of motions corresponding to different height/depth values of a pixel in the scene. These observations may be used to reduce a general 2D search for optical flow vectors at a point to 1D search starting at the flow induced by rotation, and then searching along the 1D line or curve defined by the translation. The 1D search at a pixel location is illustrated by figures below.

FIGS. 11A, 11B, 11C, 11D, and 11E are illustrations 1100A, 1100B, 1100C, 1100D, and 1100E of performing 1D searches at pixel locations in particular images according to techniques described herein.

Figure 11A:
FIGS. 11A-11E are illustrations of performing one-dimensional searches at pixel locations in particular images according to techniques described herein.
Figure 11B:
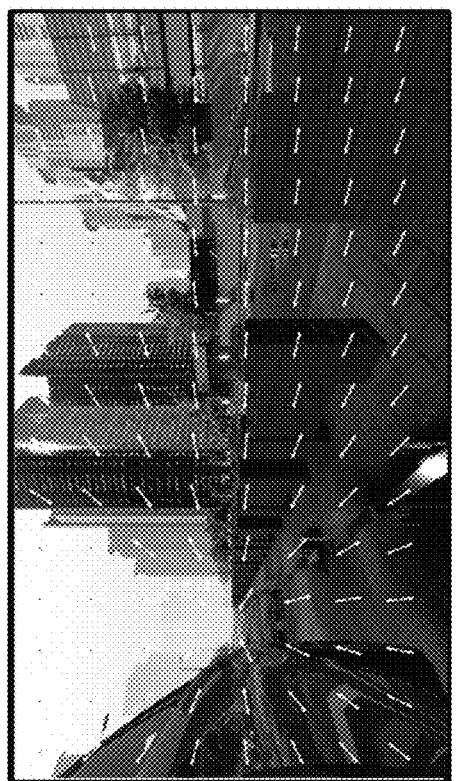

The 1D search in each of FIGS. 11A-11E includes both a direction determined by camera translation and an offset due to camera rotation. Two camera views facing different directions on a vehicle driving forward are shown in FIGS. 11A and 11B. FIG. 11A depicts a 1D search direction at each pixel for a mirror left view camera with the vehicle driving forward. FIG. 11B depicts a 1D search direction at each pixel for a forward view camera with the vehicle driving forward. The direction of 1D search is indicated by line segment overlays. Since the vehicle is driving forward there is no offset due to rotation, as seen in the next example.

Figure 11C:
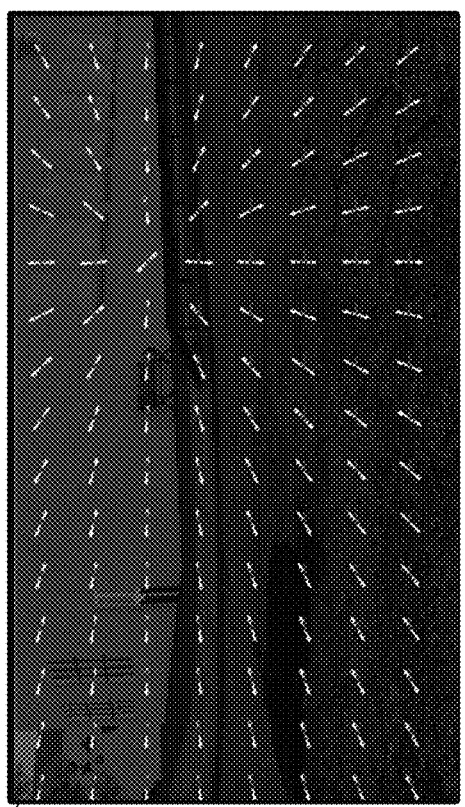
Figure 11D:
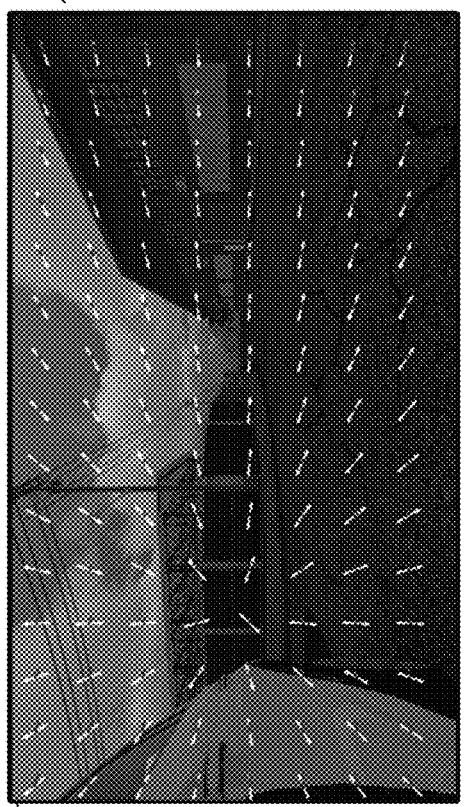

An example with the same camera locations but the vehicle turning right is shown in FIGS. 11C and 11D. FIG. 11C depicts a 1D search direction at each pixel for a mirror left view camera with the vehicle turning right. FIG. 11D depicts a 1D search direction at each pixel for a forward view camera with the vehicle turning right. The 1D search direction is still indicated by an overlaid line segment but there is an additional offset due to rotation, which can be seen.

Certain embodiments involve computing the basis rotation (dyaw) and translation (dZ and dX) flow fields. Given values of motion parameters, the offset and direction of 1D optical flow search may be defined at each pixel location. The offset is determined by scaling the basis rotation flow by the yaw-rate parameter. The direction of 1D search at a pixel p is determined by relative weights of dZ and dX due to the camera translation. A 1D search for pixel matches between the current and prior frame may be conducted in the direction determined by the line though the offset.

In the case of a distorted camera lens, the search may still be restricted to a 1D set but this set may be curved rather than lying entirely on a line as with a pinhole camera model used to produce the examples illustrated in FIGS. 11A-11E.

Figure 11E:
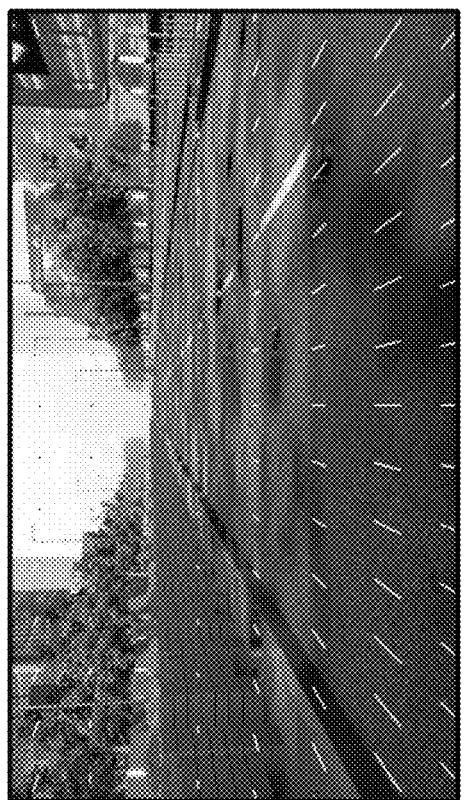

In addition to the 1D guided search direction defined for each pixel location, a search range may also be defined to further reduce the number of points tested during a search. The use of search range in addition to 1D search direction is indicated in FIG. 11E, in which a search range is indicated in addition to direction for a front view camera. The small segments show the 1D search direction, and the length corresponds to the search range.

A search constrained entirely by the offset and direction in general cannot capture pixel values corresponding to moving objects in the scene. If the motion of the object is a translation parallel to the translation of the camera, then this will lie on the 1D search curve. In some embodiments, the guidance may be used to modify a penalty term rather than fully limiting the search. The search points may be primarily located along the 1D search curve but may have some additional points off the curve to test for local motion. The penalty term will prefer the direction of motion but still allow testing for moving objects.

EMBODIMENTS

The various components of this invention are used to support improving optical flow. The models may be used additionally to improve other uses of motion information such as the detection of moving objects where the motion model information is supplied to a machine learning algorithm to determine objects that are in motion compared to the static background that has pixel flow due to the moving camera.

A model of the pixel flow induced by camera motion is determined. This may be based on an analytic analysis and/or extensions to support various lens distortion. The model defines the pixel flow resulting from camera rotation and/or translation. The model describes the spatial structure of the motion field via a small set of parameters describing camera intrinsic, camera extrinsic, and vehicle motion information. An efficient implementation is possible by computing flow fields corresponding to basis parameter changes, such as rotation or translation. The model determination and basis calculation need not be done for each camera frame, as a single initialization may be used.

Next, the parameters to the motion model may be determined from external sensors such as an inertial measurement unit, steering wheel angle sensor, or the like, and/or may be computed by fitting the model to selected flow data or to pixel data. Such a fit may be constrained by practical considerations. With the model defined and model parameters determined, the global flow may be used to provide an improved optical flow estimate. These may involve fusion when the model output is compared with the results of another optical flow estimation algorithm and the two are fused to provide an improved result. In other embodiments the model output is used to provide guidance to a local optical flow search method through specifying a set of candidates and or a modified cost function. The cost function may be modified to account for deviation from the direction of the model flow. An additional example is to modify images before use of an algorithm by pre-warping to remove global motion captured by the model, allowing later processing to concentrate on the unknown local motion. The parameter determination typically will be done per video frame, though the motion parameters are limited in how quickly they can change due to inertia of the vehicle. As a result, the parameter estimation may be done at a reduced rate in some cases.

The model and parameters are used in determination of the optical flow field in any of the methods, such as fusion, search candidates, pre-warping, and/or guided search as described above.

Example Method

Figure 12:
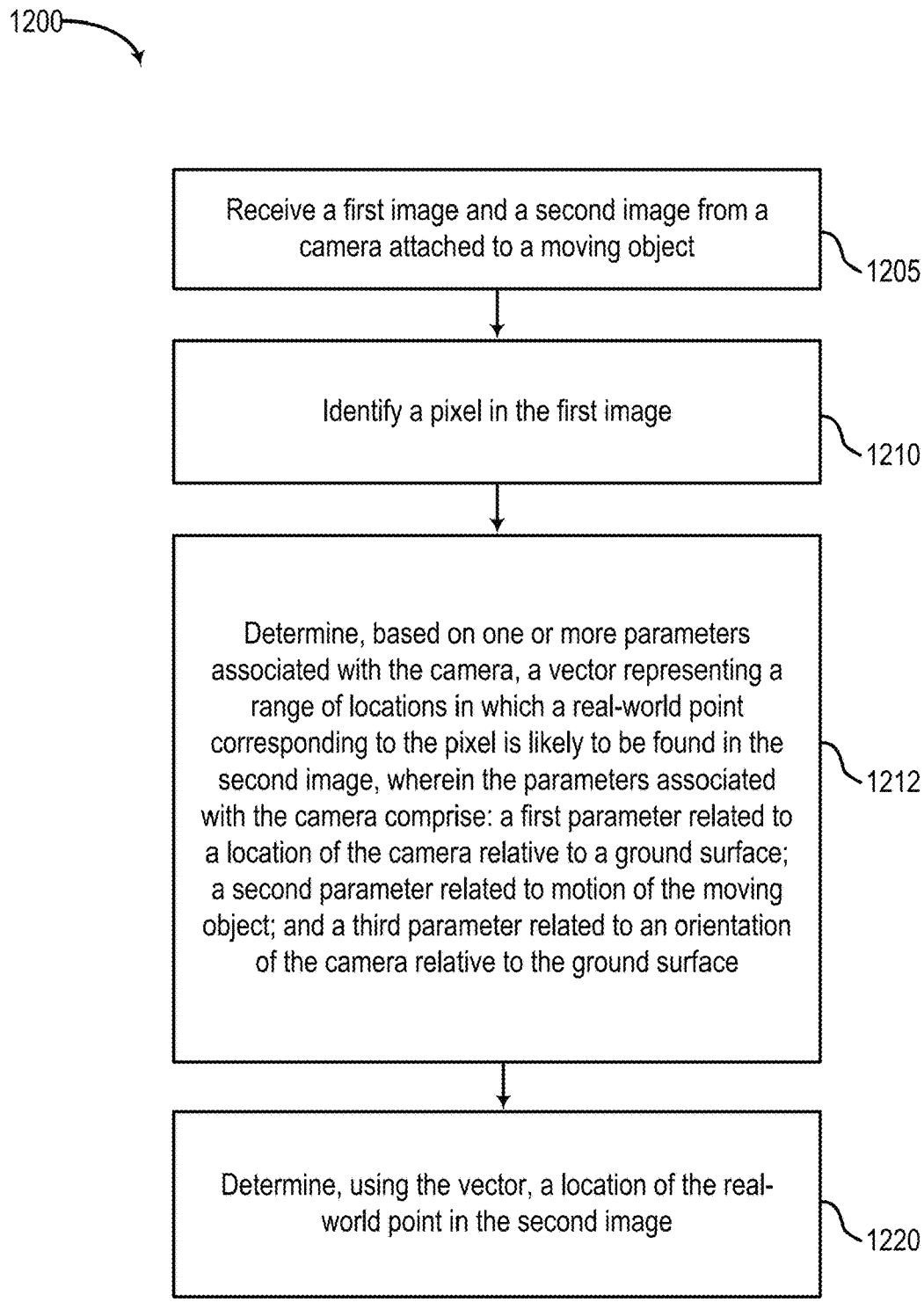
FIG. 12 depicts an example of operations related to global motion modeling.

FIG. 12 depicts example operations 1200 related to global motion modeling according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations. In some aspects, a processing system 1300 of FIG. 13 may perform operations 1200.

Operations 1200 begin at step 1205, with receiving a first image and a second image from a camera attached to a moving object.

Operations 1200 continue at step 1210, with identifying a pixel in the first image.

Operations 1200 continue at step 1215, with determining, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface. In some embodiments, determining the vector is based on projecting a plane that is parallel to the ground surface onto the first image based on a distance of the camera from the ground surface and the orientation of the camera relative to the ground surface, wherein the vector lies along the plane. In certain embodiments, determining the vector is based on applying a function to account for radial distortion of the first image resulting from known lens distortion of the camera. For example, the function may be based on a distance with respect to an optical axis of the camera.

Operations 1200 continue at step 1220, with determining, using the vector, a location of the real-world point in the second image. In some embodiments, determining, using the vector, the location of the real-world point in the second image comprises using the vector to constrain a search for the real-world point in the second image. In certain embodiments, determining, using the vector, the location of the real-world point in the second image comprises penalizing candidate points in the second image that are inconsistent with the vector.

In some embodiments, determining, using the vector, the location of the real-world point in the second image is based on applying the function to account for corresponding radial distortion of the second image resulting from the known lens distortion of the camera.

Certain embodiments further comprise determining a flow field related to the real-world point based on a weighted sum of a plurality of basis flow fields corresponding to each of a plurality of motion degrees of freedom. Some embodiments further comprise determining weights for use in the weighted sum based on the vector.

Example Processing System

Figure 13:
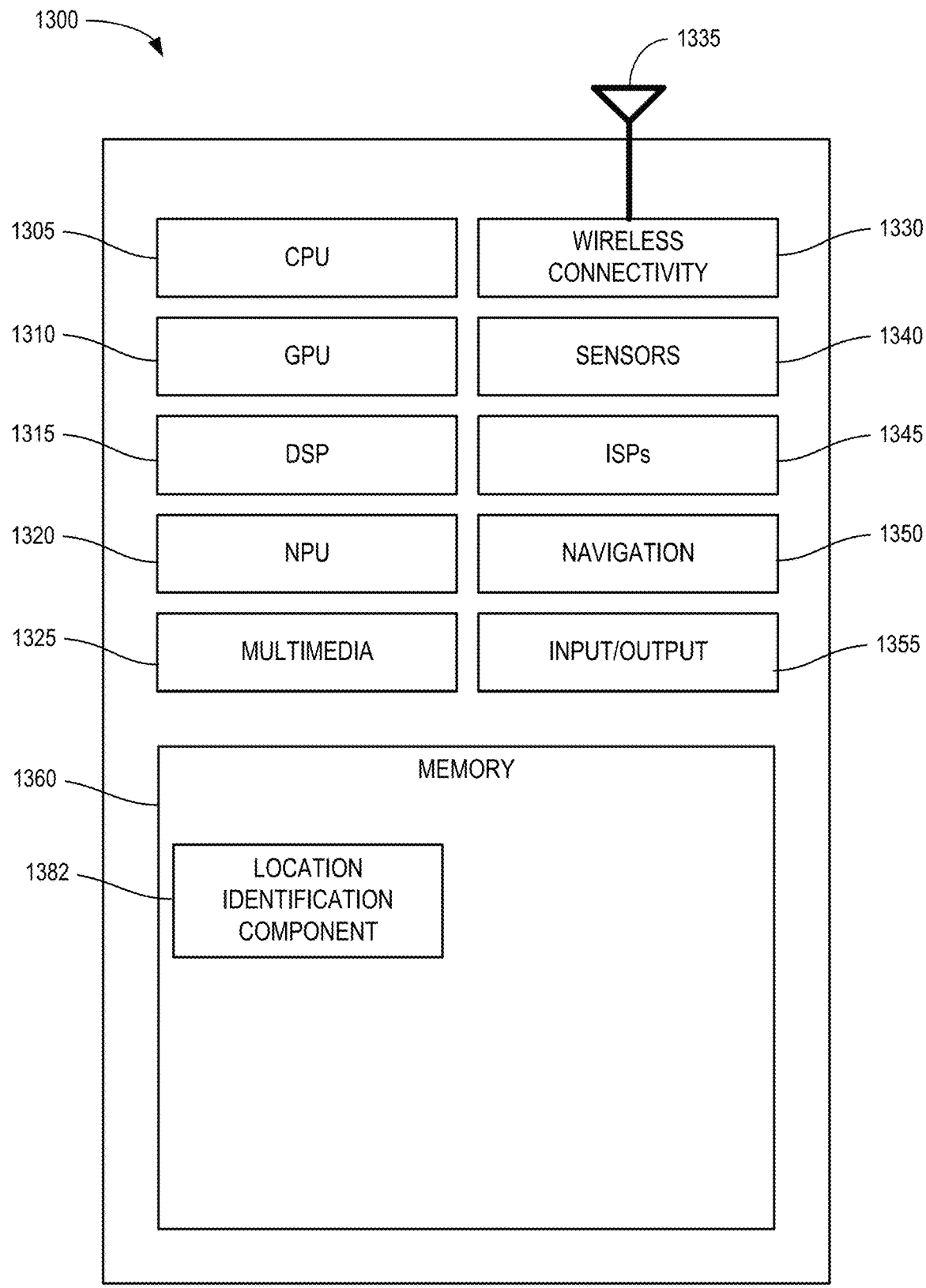
FIG. 13 depicts an example of processing system adapted to perform operations for the techniques disclosed herein, such as the operations depicted and described with respect to FIG. 12.

FIG. 13 depicts an example of processing system 1300 that includes various components operable, configured, or adapted to perform operations for the techniques disclosed herein, such as the operations depicted and described with respect to FIG. 12.

Processing system 1300 includes a central processing unit (CPU) 1305, which in some examples may be a multi-core CPU 1305. Instructions executed at the CPU 1305 may be loaded, for example, from a program memory 1360 associated with the CPU 1305 or may be loaded from memory 1360 partition.

Processing system 1300 also includes additional processing components tailored to specific functions, such as a graphics processing unit (GPU) 1310, a digital signal processor (DSP) 1315, a neural processing unit (NPU) 1320, a multimedia processing unit 1325, and a wireless connectivity 1330 component.

An NPU 1320, such as, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU 1320 may sometimes alternatively be referred to as a neural signal processor (NSP), a tensor processing unit (TPU), a neural network processor (NNP), an intelligence processing unit (IPU), or a vision processing unit (VPU).

NPUs 1320, such as, may be configured to accelerate the performance of common machine learning tasks, such as image classification, machine translation, object detection, and various other tasks. In some examples, a plurality of NPUs 1320 may be instantiated on a single chip, such as a system on a chip (SoC), while in other examples they may be part of a dedicated machine learning accelerator device.

NPUs 1320 may be optimized for training or inference, or in some cases configured to balance performance between both. For NPUs 1320 that are capable of performing both training and inference, the two tasks may still generally be performed independently.

NPUs 1320 designed to accelerate training are generally configured to accelerate the optimization of new models, which is a highly compute-intensive operation that involves inputting an existing dataset (often labeled or tagged), iterating over the dataset, and then adjusting model parameters 1384, such as weights and biases, in order to improve model performance. Generally, optimizing based on a wrong prediction involves propagating back through the layers of the model and determining gradients to reduce the prediction error.

NPUs 1320 designed to accelerate inference are generally configured to operate on complete models. Such NPUs 1320 may thus be configured to input a new piece of data and rapidly process it through an already trained model to generate a model output (e.g., an inference).

In some aspects, NPU 1320 may be implemented as a part of one or more of CPU 1305, GPU 1310, and/or DSP 1315.

NPU 1320 is a microprocessor that specializes in the acceleration of machine learning algorithms. For example, an NPU 1320 may operate on predictive models such as artificial neural networks (ANNs) or random forests (RFs). In some cases, an NPU 1320 is designed in a way that makes it unsuitable for general purpose computing such as that performed by CPU 1305. Additionally or alternatively, the software support for an NPU 1320 may not be developed for general purpose computing.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In some aspects, wireless connectivity 1330 component may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity 1330 processing component is further connected to one or more antennas 1335.

Processing system 1300 may also include one or more sensor processing units associated with any manner of sensor, one or more image signal processors (ISPs 1345) associated with any manner of image sensor, and/or a navigation 1350 processor, which may include satellite-based positioning system components (e.g., GPS or GLONASS) as well as inertial positioning system components.

Processing system 1300 may also include one or more input and/or output devices, such as screens, touch-sensitive surfaces (including touch-sensitive displays), physical buttons, speakers, microphones, and the like.

In some examples, one or more of the processors of processing system 1300 may be based on an ARM or RISC-V instruction set.

Processing system 1300 also includes memory 1360, which is representative of one or more static and/or dynamic memories, such as a dynamic random access memory 1360, a flash-based static memory 1360, and the like. In this example, memory 1360 includes computer-executable components, which may be executed by one or more of the aforementioned components of processing system 1300.

Examples of memory 1360 include random access memory (RAM), read-only memory (ROM), or a hard disk. Examples of memory 1360 include solid state memory and a hard disk drive. In some examples, memory 1360 is used to store computer-readable, computer-executable software including instructions that, when executed, cause a processor to perform various functions described herein. In some cases, memory 1360 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 1360 store information in the form of a logical state.

In particular, in this example, memory 1360 includes a location identification component, which may perform operations described herein related to global motion modeling, such as the operations depicted in FIG. 12.

Generally, processing system 1300 and/or components thereof may be configured to perform the methods described herein.

Notably, in other aspects, aspects of processing system 1300 may be omitted, such as where processing system 1300 is a server computer or the like. For example, multimedia component 1325, wireless connectivity 1330, sensors 1340, ISPs 1345, and/or navigation 1350 component may be omitted in other aspects. Further, aspects of processing system 1300 may be distributed.

Note that FIG. 13 is just one example, and in other examples, alternative processing system 1300 with more, fewer, and/or different components may be used.

In one aspect, processing system 1300 includes CPU 1305, GPU 1310, DSP 1315, NPU 1320, multimedia 1325, wireless connectivity 1330, antennas 1335, sensors 1340, ISPs 1345, navigation 1350, input/output 1355, and memory 1360.

In some aspects, sensors 1340 may include optical instruments (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

In some aspects, sensors 1340 may include direct depth sensing sensors, such as radar, LIDAR, and other depth sensing sensors, as described herein.

An input/output 1355 (e.g., an I/O controller) may manage input and output signals for a device. Input/output 1355 may also manage peripherals not integrated into a device. In some cases, input/output 1355 may represent a physical connection or port to an external peripheral. In some cases, input/output 1355 may utilize an operating system. In other cases, input/output 1355 may represent or interact with a modem, a keyboard, a mouse, a touchscreen, or a similar device. In some cases, input/output 1355 may be implemented as part of a processor (e.g., CPU 1305). In some cases, a user may interact with a device via input/output 1355 or via hardware components controlled by input/output 1355.

In some example, such as where processing system 1300 is a server computer, certain aspects may be omitted, such as wireless connectivity component 1330, antenna(s) 1335, multimedia component 1325, navigation component 1350, and sensor(s) 1340.

Notably, FIG. 13 is just use example, and many other examples and configurations of processing system 1300 are possible, including implementations involving multiple computing devices.

Example Clauses

Implementation examples are described in the following numbered clauses:

Clause 1: A method, comprising: receiving a first image and a second image from a camera attached to a moving object; identifying a pixel in the first image; determining, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface; and determining, using the vector, a location of the real-world point in the second image.

Clause 2: The method of Clause 1, wherein determining, using the vector, the location of the real-world point in the second image comprises using the vector to constrain a search for the real-world point in the second image.

Clause 3: The method of any one of Clause 1-2, wherein determining the vector is based on projecting a plane that is parallel to the ground surface onto the first image based on a distance of the camera from the ground surface and the orientation of the camera relative to the ground surface, wherein the vector lies along the plane.

Clause 4: The method of any one of Clause 1-3, wherein determining, using the vector, the location of the real-world point in the second image comprises penalizing candidate points in the second image that are inconsistent with the vector.

Clause 5: The method of any one of Clause 1-4, wherein determining the vector is based on applying a function to account for radial distortion of the first image resulting from known lens distortion of the camera.

Clause 6: The method of Clause 5, wherein determining the location of the real-world point in the second image is based on applying the function to account for corresponding radial distortion of the second image resulting from the known lens distortion of the camera.

Clause 7: The method of any one of Clause 5-6, wherein the function is based on a distance with respect to an optical axis of the camera.

Clause 8: The method of any one of Clause 1-7, further comprising determining a flow field related to the real-world point based on a weighted sum of a plurality of basis flow fields corresponding to each of a plurality of motion degrees of freedom.

Clause 9: The method of Clause 8, further comprising determining weights for use in the weighted sum based on the vector.

Clause 10: A processing system, comprising: a memory comprising computer-executable instructions; one or more processors configured to execute the computer-executable instructions and cause the processing system to: receive a first image and a second image from a camera attached to a moving object; identify a pixel in the first image; determine, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface; and determine, using the vector, a location of the real-world point in the second image.

Clause 11: The system of Clause 10, wherein determining, using the vector, the location of the real-world point in the second image comprises using the vector to constrain a search for the real-world point in the second image.

Clause 12: The system of any one of Clause 10-11, wherein determining the vector is based on projecting a plane that is parallel to the ground surface onto the first image based on a distance of the camera from the ground surface and the orientation of the camera relative to the ground surface, wherein the vector lies along the plane.

Clause 13: The system of any one of Clause 10-12, wherein determining, using the vector, the location of the real-world point in the second image comprises penalizing candidate points in the second image that are inconsistent with the vector.

Clause 14: The system of any one of Clause 10-13, wherein determining the vector is based on applying a function to account for radial distortion of the first image resulting from known lens distortion of the camera.

Clause 15: The system of Clause 14, wherein determining the location of the real-world point in the second image is based on applying the function to account for corresponding radial distortion of the second image resulting from the known lens distortion of the camera.

Clause 16: The system of any one of Clause 14-15, wherein the function is based on a distance with respect to an optical axis of the camera.

Clause 17: The system of any one of Clause 10-16, wherein the one or more processors are further configured to determine a flow field related to the real-world point based on a weighted sum of a plurality of basis flow fields corresponding to each of a plurality of motion degrees of freedom.

Clause 18: The system of Clause 17, wherein the one or more processors are further configured to determine weights for use in the weighted sum based on the vector.

Clause 19: A non-transitory computer readable medium comprising instructions that, when executed by one or more processors of a computing system, cause the computing system to: receive a first image and a second image from a camera attached to a moving object; identify a pixel in the first image; determine, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface; and determine, using the vector, a location of the real-world point in the second image.

Clause 20: The non-transitory computer readable medium of Clause 19, wherein determining, using the vector, the location of the real-world point in the second image comprises using the vector to constrain a search for the real-world point in the second image.

Clause 21: The non-transitory computer readable medium of any one of Clause 19-20, wherein determining the vector is based on projecting a plane that is parallel to the ground surface onto the first image based on a distance of the camera from the ground surface and the orientation of the camera relative to the ground surface, wherein the vector lies along the plane.

Clause 22: The non-transitory computer readable medium of any one of Clause 19-21, wherein determining, using the vector, the location of the real-world point in the second image comprises penalizing candidate points in the second image that are inconsistent with the vector.

Clause 23: The non-transitory computer readable medium of Clause 22, wherein determining the vector is based on applying a function to account for radial distortion of the first image resulting from known lens distortion of the camera.

Clause 24: The non-transitory computer readable medium of any one of Clause 22-23, wherein determining the location of the real-world point in the second image is based on applying the function to account for corresponding radial distortion of the second image resulting from the known lens distortion of the camera.

Clause 25: The non-transitory computer readable medium of any one of Clause 22-24, wherein the function is based on a distance with respect to an optical axis of the camera.

Clause 26: The non-transitory computer readable medium of any one of Clause 19-25, wherein the instructions, when executed by the one or more processors, further cause the computing system to determine a flow field related to the real-world point based on a weighted sum of a plurality of basis flow fields corresponding to each of a plurality of motion degrees of freedom.

Clause 27: The non-transitory computer readable medium of Clause 26, wherein the instructions, when executed by the one or more processors, further cause the computing system to determine weights for use in the weighted sum based on the vector.

Clause 28: An apparatus, comprising: means for receiving a first image and a second image from a camera attached to a moving object; means for identifying a pixel in the first image; means for determining, based on one or more parameters associated with the camera, a vector representing a range of locations in which a real-world point corresponding to the pixel is likely to be found in the second image, wherein the parameters associated with the camera comprise: a first parameter related to a location of the camera relative to a ground surface; a second parameter related to motion of the moving object; and a third parameter related to an orientation of the camera relative to the ground surface; and means for determining, using the vector, a location of the real-world point in the second image.

Clause 29: The apparatus of Clause 28, wherein determining, using the vector, the location of the real-world point in the second image comprises using the vector to constrain a search for the real-world point in the second image.

Clause 30: The apparatus of any one of Clause 28-29, wherein determining the vector is based on projecting a plane that is parallel to the ground surface onto the first image based on a distance of the camera from the ground surface and the orientation of the camera relative to the ground surface, wherein the vector lies along the plane.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving a first image and a second image from a camera attached to a moving object;
   identifying a pixel in the first image;
   determining, based on parameters associated with the camera, a vector representing a range of locations in which a real-world point corresponding to the pixel is likely to be found in the second image, wherein:
the parameters associated with the camera comprise:
a first parameter related to a location of the camera relative to a ground surface;
a second parameter related to motion of the moving object; and
a third parameter related to an orientation of the camera relative to the ground surface, and
determining the vector is based on projecting a plane that is parallel to the ground surface onto the first image based on the location of the camera relative to the ground surface and the orientation of the camera relative to the ground surface, wherein the vector lies along the plane; and
determining using the vector a location of the real-world point in the second image.

2. The method of claim 1, wherein determining, using the vector, the location of the real-world point in the second image comprises using the vector to constrain a search for the real-world point in the second image.

3. The method of claim 1, wherein determining, using the vector, the location of the real-world point in the second image comprises penalizing candidate points in the second image that are inconsistent with the vector.

4. The method of claim 1, wherein determining the vector is based on applying a function to account for radial distortion of the first image resulting from known lens distortion of the camera.

5. The method of claim 4, wherein determining the location of the real-world point in the second image is based on applying the function to account for corresponding radial distortion of the second image resulting from the known lens distortion of the camera.

6. The method of claim 4, wherein the function is based on a distance with respect to an optical axis of the camera.

7. The method of claim 1 further comprising determining a flow field related to the real-world point based on a weighted sum of a plurality of basis flow fields corresponding to each of a plurality of motion degrees of freedom.

8. The method of claim 7 further comprising determining weights for use in the weighted sum based on the vector.

9. A processing system comprising:
a memory comprising computer-executable instructions;
one or more processors configured to execute the computer-executable instructions and cause the processing system to:
receive a first image and a second image from a camera attached to a moving object;
identify a pixel in the first image;
determine, based on parameters associated with the camera, a vector representing a range of locations in which a real-world point corresponding to the pixel is likely to be found in the second image, wherein:
the parameters associated with the camera comprise:
a first parameter related to a location of the camera relative to a ground surface;
a second parameter related to motion of the moving object; and
a third parameter related to an orientation of the camera relative to the ground surface, and
determining the vector is based on projecting a plane that is parallel to the ground surface onto the first image based on the location of the camera relative to the ground surface and the orientation of the camera relative to the ground surface, wherein the vector lies along the plane; and
determine using the vector a location of the real-world point in the second image.

10. The system of claim 9, wherein determining, using the vector, the location of the real-world point in the second image comprises using the vector to constrain a search for the real-world point in the second image.

11. The system of claim 9, wherein determining, using the vector, the location of the real-world point in the second image comprises penalizing candidate points in the second image that are inconsistent with the vector.

12. The system of claim 9, wherein determining the vector is based on applying a function to account for radial distortion of the first image resulting from known lens distortion of the camera.

13. The system of claim 12, wherein determining the location of the real-world point in the second image is based on applying the function to account for corresponding radial distortion of the second image resulting from the known lens distortion of the camera.

14. The system of claim 12, wherein the function is based on a distance with respect to an optical axis of the camera.

15. The system of claim 9, wherein the one or more processors are further configured to determine a flow field related to the real-world point based on a weighted sum of a plurality of basis flow fields corresponding to each of a plurality of motion degrees of freedom.

16. The system of claim 15, wherein the one or more processors are further configured to determine weights for use in the weighted sum based on the vector.

17. A non-transitory computer readable medium comprising instructions that, when executed by one or more processors of a computing system, cause the computing system to:
receive a first image and a second image from a camera attached to a moving object;
identify a pixel in the first image;
determine, based on parameters associated with the camera, a vector representing a range of locations in which a real-world point corresponding to the pixel is likely to be found in the second image, wherein:
the parameters associated with the camera comprise:
a first parameter related to a location of the camera relative to a ground surface;
a second parameter related to motion of the moving object; and
a third parameter related to an orientation of the camera relative to the ground surface, and
determining the vector is based on projecting a plane that is parallel to the ground surface onto the first image based on the location of the camera relative to the ground surface and the orientation of the camera relative to the ground surface, wherein the vector lies along the plane; and
determine using the vector a location of the real-world point in the second image.

18. The non-transitory computer readable medium of claim 17, wherein determining, using the vector, the location of the real-world point in the second image comprises using the vector to constrain a search for the real-world point in the second image.

19. The non-transitory computer readable medium of claim 17, wherein determining, using the vector, the location of the real-world point in the second image comprises penalizing candidate points in the second image that are inconsistent with the vector.

20. The non-transitory computer readable medium of claim 19, wherein determining the vector is based on applying a function to account for radial distortion of the first image resulting from known lens distortion of the camera.

21. The non-transitory computer readable medium of claim 20, wherein determining the location of the real-world point in the second image is based on applying the function to account for corresponding radial distortion of the second image resulting from the known lens distortion of the camera.

22. The non-transitory computer readable medium of claim 20, wherein the function is based on a distance with respect to an optical axis of the camera.

23. The non-transitory computer readable medium of claim 17, wherein the instructions, when executed by the one or more processors, further cause the computing system to determine a flow field related to the real-world point based on a weighted sum of a plurality of basis flow fields corresponding to each of a plurality of motion degrees of freedom.

24. The non-transitory computer readable medium of claim 23, wherein the instructions, when executed by the one or more processors, further cause the computing system to determine weights for use in the weighted sum based on the vector.

25. An apparatus comprising:
  means for receiving a first image and a second image from a camera attached to a moving object;
  means for identifying a pixel in the first image;
  means for determining, based on parameters associated with the camera, a vector representing a range of locations in which a real-world point corresponding to the pixel is likely to be found in the second image, wherein:
    the parameters associated with the camera comprise:
      a first parameter related to a location of the camera relative to a ground surface;
      a second parameter related to motion of the moving object; and
      a third parameter related to an orientation of the camera relative to the ground surface, and
    determining the vector is based on projecting a plane that is parallel to the ground surface onto the first image based on the location of the camera relative to the ground surface and the orientation of the camera relative to the ground surface, wherein the vector lies along the plane; and
  means for determining using the vector a location of the real-world point in the second image.

26. The apparatus of claim 25, wherein determining, using the vector, the location of the real-world point in the second image comprises using the vector to constrain a search for the real-world point in the second image.

* * * * *